United States Patent [19]

Sumimoto et al.

[11] Patent Number: 5,267,491
[45] Date of Patent: Dec. 7, 1993

[54] CONTROL SYSTEM OF AN AUTOMATIC TRANSMISSION

[75] Inventors: Takayuki Sumimoto; Minoru Kuriyama; Kazunori Enokido; Hidehiko Mishima; Tatsutoshi Miyabe; Toshihisa Marusue, all of Hiroshima, Japan

[73] Assignee: Mazda Motor Corporation, Hiroshima, Japan

[21] Appl. No.: 997,514

[22] Filed: Dec. 28, 1992

[30] Foreign Application Priority Data

Dec. 26, 1991 [JP] Japan .................. 3-360723
May 6, 1992 [JP] Japan .................. 4-140927
May 6, 1992 [JP] Japan .................. 4-140928

[51] Int. Cl.⁵ .......................... F16H 61/08
[52] U.S. Cl. .............................. 74/866
[58] Field of Search .................... 74/866

[56] References Cited

U.S. PATENT DOCUMENTS

| | | | |
|---|---|---|---|
| 4,283,970 | 8/1981 | Vukovich | 74/866 |
| 4,685,356 | 8/1987 | Iwatsuki | 74/866 |
| 4,693,143 | 9/1987 | Harada et al. | 74/866 |
| 4,708,032 | 11/1987 | Harada et al. | 74/866 |
| 4,722,249 | 2/1988 | Harada et al. | 74/866 |
| 4,724,725 | 2/1988 | Harada et al. | 74/866 |
| 4,945,482 | 7/1990 | Nishikawa et al. | 364/424.1 |
| 4,991,099 | 2/1991 | Markyvech et al. | 364/424.1 |
| 5,131,298 | 7/1992 | Marusue | 74/866 |

FOREIGN PATENT DOCUMENTS 62-4950 10/1987 Japan .
63-3183 1/1988 Japan .

*Primary Examiner*—Dirk Wright
*Attorney, Agent, or Firm*—Fish & Richardson

[57] ABSTRACT

The control system for an automatic transmission shifts the main transmission simultaneously with the auxiliary transmission at the time of a particular shift. At this time, a target gear ratio progress value of the auxiliary transmission is set for a gear ratio progress value indicative of a shift progress state of the main transmission. The main transmission is arranged so as to finish the shift control within a given target period of time, and the auxiliary transmission is arranged to implement the shift control by the feedback control so as to follow the target gear ratio progress value. The shift control of the auxiliary transmission is corrected by the learning control on the basis of a deviation between the target gear ratio progress value and the actual gear ratio progress value.

29 Claims, 20 Drawing Sheets

CONTROL SYSTEM OF AN AUTOMATIC TRANSMISSION

BACKGROUND OF THE INVENTION

1. Field of the Invention

The present invention relates to a control system of an automatic transmission and, more particularly, to a control system of an automatic transmission for an automotive vehicle, particularly an automatic transmission with a main transmission and an auxiliary transmission, so adapted as to improve the prevention of a shift shock of the vehicle by enabling a stable control of the automatic transmission by implementing both of a feedback control and a learning control at the time of a transition of a shift of both of the main transmission and the auxiliary transmission.

2. Description of the Related Art

Recently, an automatic transmission for an automotive vehicle, having a main transmission and an auxiliary transmission connected with the main transmission, has been proposed and are being developed for commercialization, the automatic transmission being provided with five forward speed stages and one rearward speed stage. For the automatic transmission with the main transmission and the auxiliary transmission, however, it is extremely difficult to control a shift to be made by the main transmission simultaneously with the auxiliary transmission. A shift shook may be caused to occur unless a shift between the coupling of friction coupling elements of both of the main transmission and the auxiliary transmission and the releasing of the coupling therebetween be performed in an appropriate way, i.e. unless the pressure for coupling the friction coupling elements and the pressure for releasing the coupling thereof are controlled appropriately.

Japanese Patent Unexamined Publication (kokai) No. 62-4,950 discloses technology that involves preventing a shift shock by starting the shift of the main transmission prior to the shift of the auxiliary transmission and, at the same time, synchronizing the shift of the main transmission with that of the auxiliary transmission at the time of the end of the shift.

Japanese Patent Examined Publication (kokoku) No. 63-3,183 discloses a control system for compensating for a line pressure, which is so adapted as to control the line pressure of the automatic transmission by performing a learning control on the basis of a deviation between a target shift time and an actual shift time in implementing the shift of the automatic transmission.

When the main transmission and the auxiliary transmission of the automatic transmission are shifted simultaneously, it is necessary to couple one or more friction coupling elements and to release the coupling of the plural friction coupling elements; however, a shift shock may be caused to occur one or plural times if the control of the pressure for coupling or releasing the coupling of the friction coupling element and elements would not be appropriate.

A control system for an automatic transmission is being developed, which is so adapted as to control the coupling pressure of the friction coupling elements to set a target gear ratio progress value to a predetermined value on the basis of a gear ratio progress value of the main transmission and a gear ratio progress value of the auxiliary transmission, when the main transmission and the auxiliary transmission are shifted simultaneously. The control system of this kind is arranged to control an actual shift progress state, i.e. a state in which an actual shift progresses, so as to follow a target value preset by using the gear ratio progress value of the main transmission and the gear ratio progress value of the auxiliary transmission as parameters, the gear ratio progress values being determined on a real time. However, the shift control cannot be achieved with high and stable responsiveness unless parameters such as abrasion of abrasive materials for the friction coupling elements of the transmissions, oil temperature, changes in characteristics of operating oil, abrasion of gears, engine load, outside air temperature, and so on, be taken into account, because these parameters may affect the shift control.

The technology as disclosed in Japanese Patent Laid-open Publication No. 62-4,950 cannot solve the problems as have described hereinabove, because it relates to the adjustment of the shift timing of the main transmission and the shift timing of the auxiliary transmission. On the other hand, the technology as disclosed in Japanese Patent Laid-open Publication No. 63-3,183 is involved with the adjustment of the line pressure and it cannot be applied directly to the shift control at the time of transition of the automatic transmission with both of the main transmission and the auxiliary transmission.

SUMMARY OF THE INVENTION

Therefore, the present invention has the object to provide a control system for an automatic transmission, so adapted as to perform the shift control with high stability and high responsiveness by incorporating the feedback control and the learning control into the automatic transmission so as to follow a target value for a shift progress state in which the shift of the transmission progresses.

In order to achieve the aforesaid object, the present invention has the object to provide a control system for an automatic transmission with a main transmission and an auxiliary transmission connected thereto, so adapted as each of said main transmission and auxiliary transmission to implement a shift by changing an operating state of a hydraulic friction coupling element thereof, said control system comprising:

target value setting means for setting a target value for a shift progress state in which the shift progresses at the time of the shift, when the shift of the automatic transmission as a whole is implemented by shifting said main transmission simultaneously with said auxiliary transmission;

feedback control means for implementing feedback control for coupling pressure of said friction coupling element thereof so as for an actual shift progress state at the time of the shift to follow said target value; and first learning control means for correcting the coupling pressure of said friction coupling element of either of said main transmission or said auxiliary transmission by learning control on the basis of a deviation of said actual shift progress state for said target value.

The aforesaid arrangement for the control system according to the present invention can implement the shift control of the automatic transmission by feedback control so as to follow the target value for the shift progress state in which the shift progresses. Further, the coupling pressure of the friction coupling elements of one of the transmissions can be corrected by the learning control with an influence of abrasion of the abrasive materials for the friction coupling elements, oil temperature, changes in characteristics of operating oil, abrasion of gears, outside temperature, and so on upon the shift control taken into account, thereby stabilizing the shift control by the feedback control and improving responsiveness of the shift control.

Other objects, features and advantages of the present invention will become apparent in the course of the description of the preferred embodiments, which follows, with reference to the accompanying drawings.

DESCRIPTION OF THE PREFERRED EMBODIMENTS

The present invention will be described more in detail with reference to the accompanying drawings.

Figure 1:
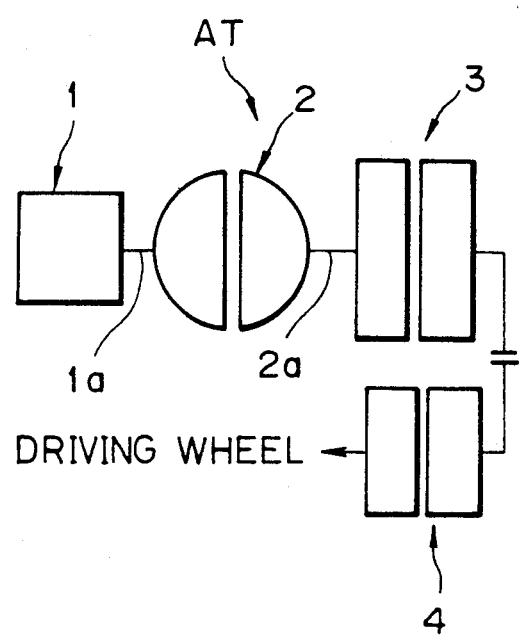
FIG. 1 is a schematic representation showing an outline of an automatic transmission connected to an engine according to an embodiment of the present invention.
Figure 2:
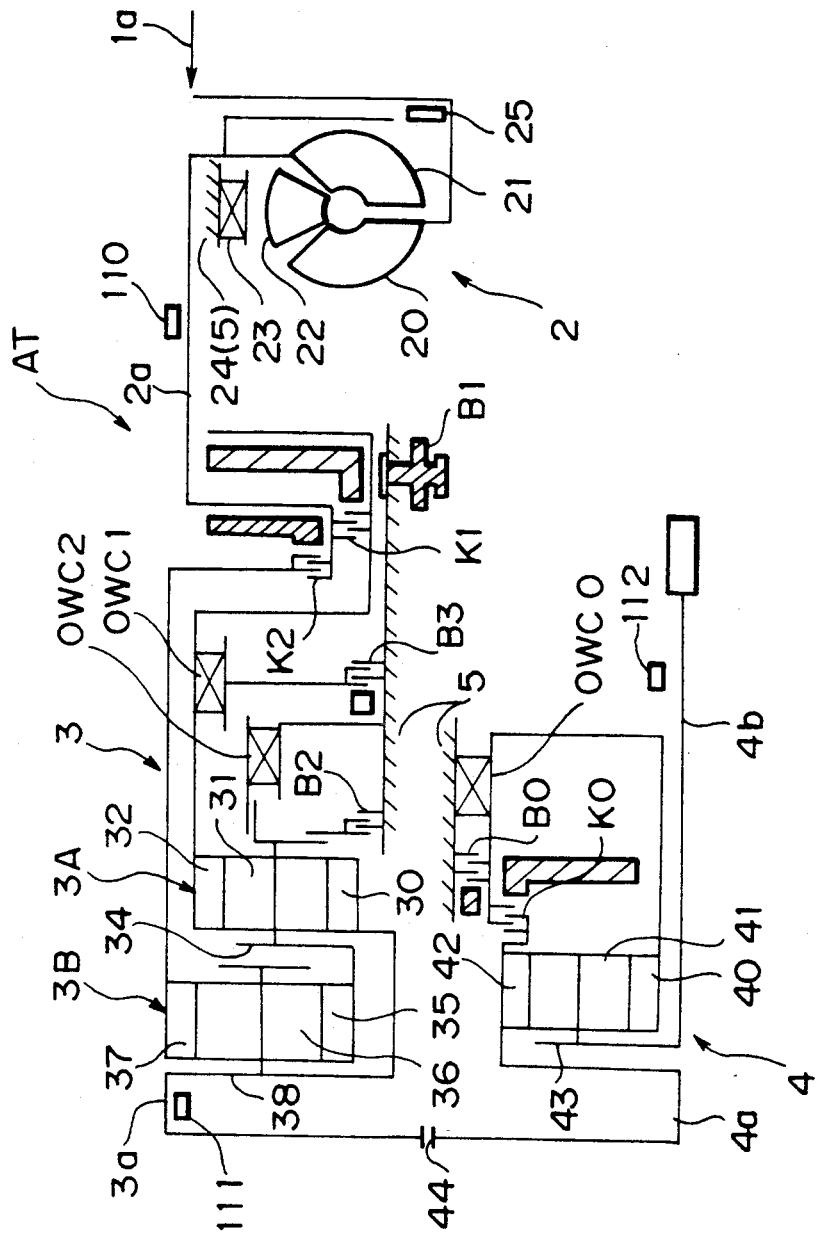
FIG. 2 is a schematic representation showing an outline of the mechanical structure of the automatic transmission according to the embodiment of the present invention.

Mechanical Structure of Automatic Transmission (FIGS. 1-2)

As shown in FIG. 1, output of an engine 1 is transmitted to driving wheels through a torque converter 2 and an automatic transmission AT comprising a main transmission 3 and an auxiliary transmission 4. Further, as shown in FIG. 2, the torque converter 2 comprises a pump 20 connected to an output shaft 1a of the engine 1, a turbine 21 disposed facing the pump 20, and a stater 22 interposed between the pump 20 and the turbine 21. The stater 22 is arranged in such a manner that it is allowed to rotate through a one-way clutch 23 on a fixed axle 24 integral with a casing 5 of the automatic transmission AT. The one-way clutch 23 is disposed to allow the rotation of the stater 22 only in the direction in which the pump 20 rotates, yet to inhibit the rotation thereof in the opposite direction.

To the turbine 21 is connected an output shaft 2a of the torque converter 2, and a lock-up clutch 25 is interposed between the output shaft 2a and the pump 20. The lock-up clutch 25 is arranged in such a manner that it is always biased in a direction of constantly coupling the clutch, or locking it up by the aid of the hydraulic pressure of an operating oil circulating within the torque converter 2 and, on the other hand, that it is sustained in an open state on the basis of the releasing oil pressure of a releasing oil supplied from the outside. By draining the releasing oil pressure, the output shaft 1a of the engine 1 is locked up directly with the output shaft 2a of the torque converter 2.

The main transmission 3 comprises a forward planetary gear mechanism 3A and a rear planetary gear mechanism 3B; the front planetary gear mechanism 3A further comprises three gear elements consisting of a sun gear 30, a pinion gear 31, and a ring gear 32, and a planetary carrier 34, and the rear planetary gear mechanism 3B further comprises three gear elements consisting of a sun gear 35, a pinion gear 36, and a ring gear 37, and a planetary carrier 38. The planetary carrier 34 is connected with the sun gear 35, the sun gear 30 is connected with the planetary carrier 38, and the planetary carrier 38 is connected with an output shaft 3a of the main transmission 3.

The output shaft 2a of the torque converter 2 is connected with the ring gear 32 through a first clutch K1, on the one hand, and with the ring gear 37 through a second clutch K2, on the other hand. The main transmission 3 is provided with three brakes fixed to the casing 5 thereof, i.e. a first brake B1, a second brake B2, and a third brake B3. By combining the coupling of the friction coupling elements consisting of the first brake B1, the second brake B2, and the third brake B3 as well as the first clutch K1 and the second clutch K2, and the releasing of the coupling thereof, three forward speed stages and one rearward speed stage can be achieved. In addition, the main transmission 3 is provided with a one-way clutch OWC1 and a one-way clutch OWC2.

On the other hand, the auxiliary transmission 4 comprises a planetary gear member consisting of three gear elements including a sun gear 40, a pinion gear 41, and a ring gear 42, and a planetary carrier 43. The ring gear 42 is connected with an input shaft 4a of the auxiliary transmission 4, the input shaft 4a is in turn connected with the output shaft 3a of the main transmission 3 through a gear 44, and the planetary carrier 43 is connected with an output shaft 4b of the auxiliary transmission 4. Further, the auxiliary transmission 4 is provided with a brake B0 fixed to the casing 5, which in turn is arranged to connect the sun gear 40 with the ring gear 42 together with a clutch K0. By combining the coupling of the friction coupling elements consisting of the brake B0 and the clutch K0 with the releasing of the coupling thereof, the auxiliary transmission 4 is so adapted as to attain a high speed stage (H) and a low speed stage (L). In addition, the auxiliary transmission 4 is provided with a one-way clutch OWC0.

The automatic transmission AT is so arranged as to achieve the shift modes of the five forward speed stages and the one rearward speed stage, as will be shown in Table 1 below, by combining the coupling of the first brake B1, the second brake B2, the third brake B3, and the brake B0 as well as the first clutch K1, the second clutch K2, and clutch K0. In Table 1 below, reference symbol "O" denotes a coupling operation; reference symbol "(O)" denotes a coupling operation during coasting; and reference symbol "$\widehat{X}$" denotes a freely coupling state of the one-way clutches that do not transmit any power. Further, the auxiliary transmission 4 is referred to as "sub-transmission" in Table 1 below and this reference is also applicable to tables that follow and the drawings. In Table 2 below, it is shown the relationship of the shift modes of the five forward speed stages with the speed stages of the main transmission 3 and the auxiliary transmission 4 and with the gear ratios thereof.

TABLE 2

| | SPEED STAGES | | GEAR RATIOS | | FINAL GEAR RATIOS |
|---|---|---|---|---|---|
| | MAIN TRANS-MISSION | SUB-TRANS-MISSION | MAIN TRANS-MISSION | SUB-TRANS-MISSION | |
| FIRST SPEED STAGE | FIRST | L | 2.9 | 1.5 | 4.35 |
| SECOND SPEED STAGE | FIRST | H | 2.9 | 1.0 | 2.9 |
| THIRD SPEED STAGE | SECOND | L | 1.4 | 1.5 | 2.1 |
| FOURTH SPEED STAGE | THIRD | L | 1.0 | 1.5 | 1.5 |
| FIFTH SPEED STAGE | THIRD | H | 1.0 | 1.0 | 1.0 |

Figure 3:
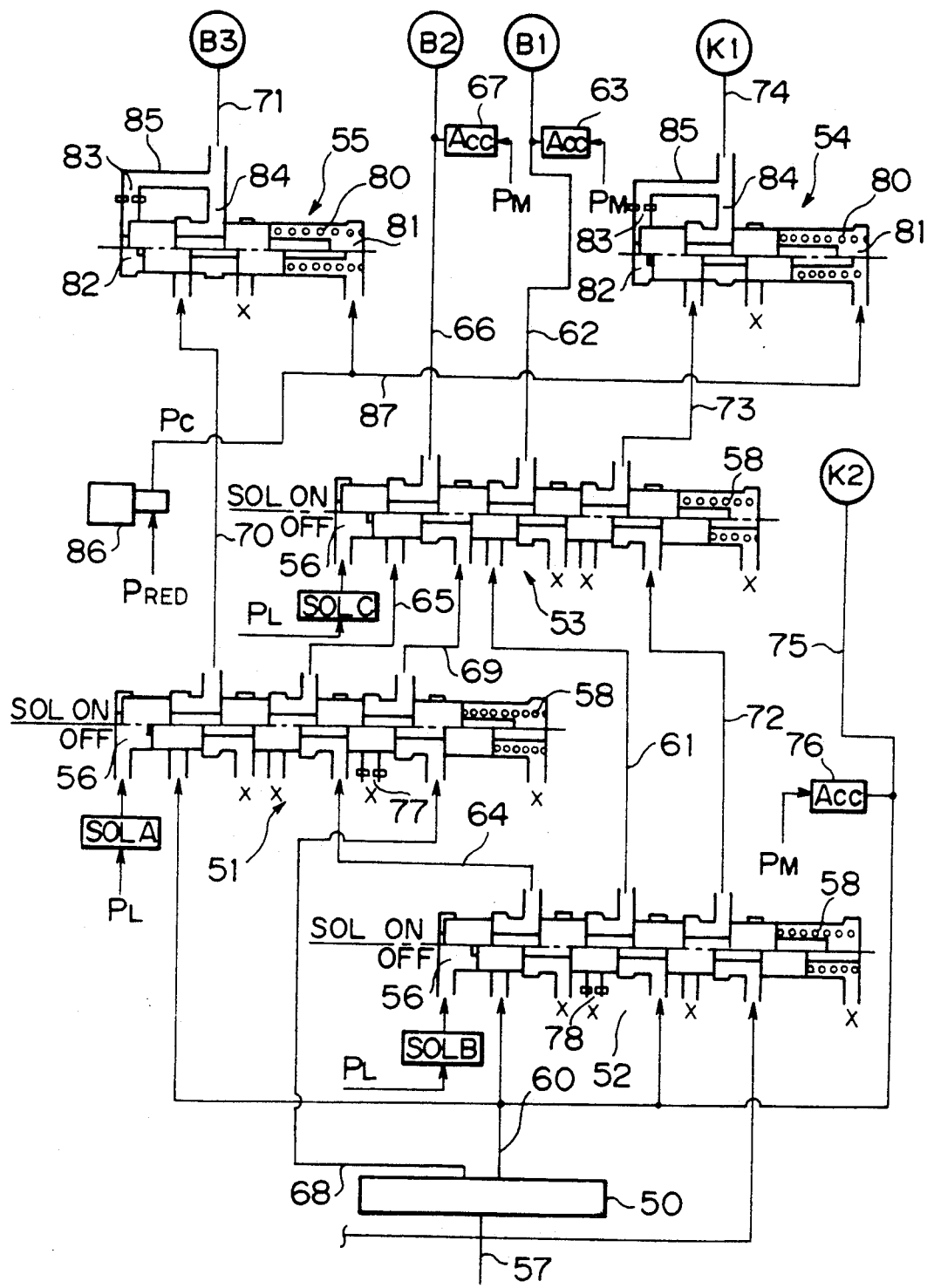
FIG. 3 is a schematic representation showing a hydraulic circuit of a main transmission of the automatic transmission according to the embodiment of the present invention.
Figure 4:
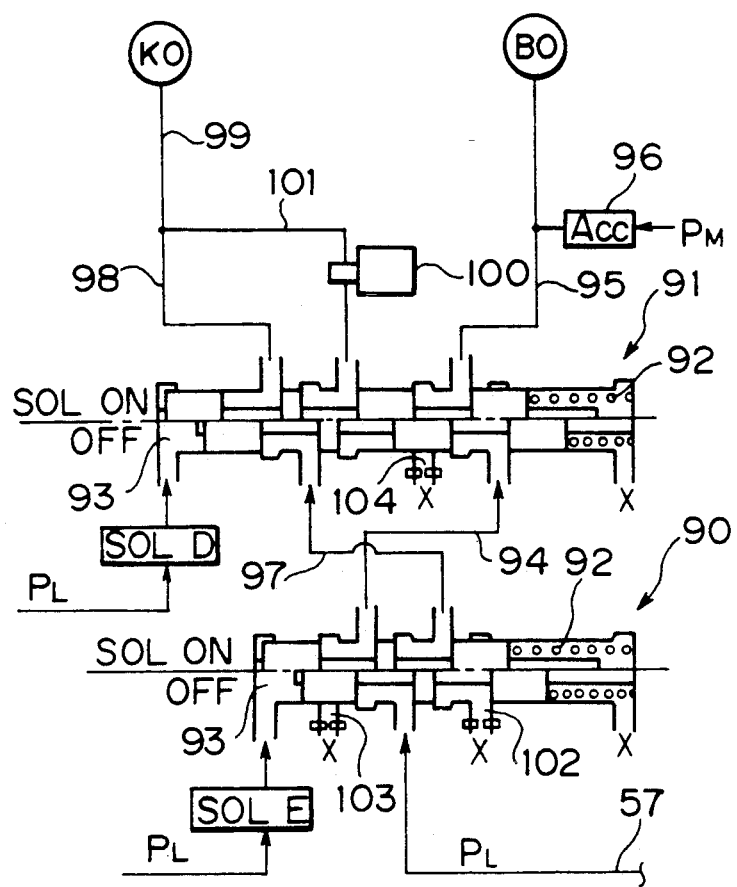
FIG. 4 is a schematic representation showing a hydraulic circuit of an auxiliary transmission of the automatic transmission according to the embodiment of the present invention.

Hydraulic Pressure Circuit (FIGS. 3-4)

A description will now be made of an oil pressure circuit of the automatic transmission AT with reference to FIGS. 3 and 4.

As shown in FIGS. 3 and 4, line pressure $P_L$ created by an oil pump (not shown) is supplied to a manual pump 50 through a hydraulic line pressure passage 57; the manual pump 50 is connected to a shift lever (not shown) that is so arranged as to shift the transmission to take a neutral position (N), a parking position (P), a reverse position (R), and a drive position (D) and to supply the drain pressure, the drain pressure, the R-range pressure, and the D-range pressure to the ports, respectively. It can be noted herein that the range pressure itself is equal to the line pressure $P_L$.

Now, a description will be made of a hydraulic system for the brakes B1, B2, and B3 as well as the clutches K1 and K2, which function as the friction coupling elements of the main transmission 3. As shown in FIG. 3, the hydraulic system is provided with three shift valves 51, 52, 53 and two pressure control valves 54, 55. A spool of each of the shift valves 51, 52, and 53 is provided with four lands, and the spool is biased to the left in FIG. 3 with a spring 58. The oil chamber 56 at the left end portion of each of the shift valves 51, 52, and 53 is so arranged as to be supplied with the line pressure $P_L$ through on-off solenoid valves SOL A, SOL B, and SOL C. When each of the on-off solenoid valves SOL A, SOL B, and SOL C is in an ON state, the hydraulic pressure of the oil chamber 56 is drained and the shift valves 51, 52, and 53 are allowed to take the position as indicated at its upper half portion as shown in FIG. 3. On the other hand, when each of the on-off solenoid valves SOL A, SOL B, and SOL C is in an OFF state, the oil chamber 56 is supplied with the line pressure P,, thereby allowing the shift valves 51, 52, and 53 to take

TABLE 1

| SPEED STAGES | COUPLED PATTERNS | | | | | | | | | |
|---|---|---|---|---|---|---|---|---|---|---|
| | MAIN TRANSMISSION | | | | | SUB-TRANS-MISSION | | CLUTCHES | | |
| | K1 | K2 | B1 | B2 | B3 | K0 | B0 | OWC0 | OWC1 | OWC2 |
| FIRST | | O | | (O) | | | O | O | | O |
| SECOND | | O | | (O) | | O | | O | | O |
| THIRD | | O | (O) | | O | | O | O | O | |
| FOURTH | O | O | | | $\widehat{X}$ | | O | O | | |
| FIFTH | O | O | | | $\widehat{X}$ | O | | | | | the position as indicated at its lower half portion as shown in FIG. 3.

More specifically, the first brake B1 can be supplied with the D-range pressure from a hydraulic D-range pressure path 60 through the shift valve 52, a hydraulic path 61, the shift valve 53, and a hydraulic path 62; the second brake B2 can be supplied with the D-range pressure from the hydraulic D-range pressure path 60 through the shift valve 52, a hydraulic path 64, the shift valve 51, a hydraulic path 65, the shift valve 53, and a hydraulic path 66, on the one hand, and further with the R-range pressure from a hydraulic R-range pressure path 68 through the shift valve 51, a hydraulic path 69, the shift valve 53, and the hydraulic path 66, on the other hand; the third brake B3 can be supplied with the D-range pressure from the hydraulic D-range pressure path 60 through the shift valve 51, a hydraulic path 70, the pressure control valve 55, and a hydraulic path 71; the first clutch K1 can be supplied with the line pressure $P_L$ from the hydraulic line pressure passage 57 through the shift valve 52, a hydraulic path 72, the shift valve 53, a hydraulic path 73, the pressure control valve 54, and a hydraulic path 74; and the second clutch K2 can be supplied with the D-range pressure from the hydraulic D-range pressure path 60 through a hydraulic path 75. To the hydraulic paths 62, 66, and 75 are connected accumulators 63, 67, and 76, respectively, each being so arranged as to receive a modulator pressure $P_M$. In FIG. 3, reference numerals 77 and 78 denote each an orifice, and reference symbol "x" denotes a drain port.

On the other hand, a spool of each of the pressure control valves 54 and 55 is provided with two lands, and the spool is biased with a spring 80 to the left in FIG. 3. The oil chamber 82 at the left end of each of the pressure control valves 54 and 55 is connected with an output port 84 through a hydraulic path 85 with an orifice 83, and an oil chamber 81 through a hydraulic path 87 with the spring 80 accommodated therein is supplied with control pressure $P_C$ obtained by governing pressure $P_{RED}$ (a constant pressure) with a linear solenoid valve 86, whereby the control pressure $P_C$ is so arranged as to control the hydraulic pressure of the output port 84 (the hydraulic pressure to be supplied to the third brake B3 and the first clutch K1). It can be noted herein that the pressure control valves 54 and 55 are arranged in such a manner that the controlled hydraulic pressure is supplied to the output port 84 when the hydraulic pressure is supplied to each input port thereof, on the one hand, and the hydraulic pressure of the output port 84 is drained, too, when the hydraulic pressure of each input port thereof is drained, on the other hand.

Then, a description will be made of the hydraulic system of the brake B0 and the clutch K0 for the auxiliary transmission 4. As shown in FIG. 4, the hydraulic system of the auxiliary transmission 4 is provided with two shift valves 90 and 91, each having substantially the same structure as each of the shift valves 51, 52, and 53. A spool of each of the shift valves 90 and 91 is biased to the left in FIG. 4 with a spring 92 and a chamber with the spring 92 accommodated therein is drained. The oil chamber 93 at the left end portion of each of the shift valves 90 and 91 is arranged so as to be supplied with line pressure $P_L$ through on-off solenoid valves SOL D and SOL E.

The brake B0 is arranged so as to be supplied with line pressure $P_L$ from the hydraulic line pressure passage 57 through the shift valve 90, a hydraulic path 94, the shift valve 91, and a hydraulic path 95, and the clutch K0 is arranged so as to be supplied with line pressure $P_L$ from the hydraulic line pressure passage 57 through the shift valve 90, a hydraulic path 97, the shift valve 91, a hydraulic path 98, and a hydraulic path 99. It is noted herein that, when the on-off solenoid valve SOL D is turned on, the clutch K0 is supplied with hydraulic pressure governed with a linear solenoid valve 100 from the hydraulic line pressure passage 57 through the shift valve 90, the hydraulic path 97, the shift valve 94 a hydraulic path 101 with a linear solenoid valve 100 disposed, and the hydraulic path 99 and that when both of the on-off solenoid valves SOL D and SOL E are turned on, the hydraulic pressure of the clutch K0 can be drained through the hydraulic path 101. In FIG. 4, reference numerals 102, 103, and 104 denote each an orifice; reference symbol "x" denotes a drain port; and an accumulator 96 is connected to the hydraulic path 95 for receiving the modulator pressure $P_M$.

Table 3 shows the relationship of the speed ranges and the speed stages of the automatic transmission AT with the coupled patterns of the friction coupling elements of the main transmission 3 (the first clutch K1, the second clutch K2, the first brake B1, the second brake B2, and the third brake B3) and the friction coupling elements of the auxiliary transmission 4 (the clutch K0, and the brake B0) and with the positions of the shift valves 51, 52, and 53 and the shift valves 90, 91, i.e. with the solenoid patterns of the on-off solenoid valves SOL A, SOL B, and SOL C of the main transmission 3 and the on-off solenoid valves SOL D and SOL E of the auxiliary transmission 4. In Table 3 below, reference symbol "O" denotes a coupling operation; reference symbol "(O)" denotes a coupling operation during coasting; and reference symbol "(X)" denotes a freely coupling state of the one-way clutches that do not transmit any power. Further, the auxiliary transmission 4 is referred to as "sub-transmission" in Table 3 below.

Table 4 shows the relationship of the speed ranges and the speed stages of the main transmission 3 with the coupled patterns of the friction coupling elements of the main transmission 3 and with the solenoid patterns of the on-off solenoid valves SOL A, SOL B, and SOL C. In Table 4, reference symbol "O" denotes a coupling operation; reference symbol "(X)" denotes a freely coupling state of the one-way clutches that do not transmit any power; reference terms "first speed (A)", "second speed (A)", "second speed (B)", and "third speed (A)" denote each an auxiliary speed stage. It can be noted herein that the coupling of the first clutch K1 during the neutral range (N) or the parking range (P) is made so as to enhance responsiveness to the shift to the drive range or the reverse range (R).

TABLE 3

| SPEED RANGES & SPEED STAGES | COUPLED PATTERNS | | | | | | | SOLENOID PATTERNS | | | | |
|---|---|---|---|---|---|---|---|---|---|---|---|---|
| | MAIN TRANSMISSION | | | | | SUB-TRANS-MISSION | | MAIN TRANSMISSION | | | SUB-TRANS-MISSION | |
| | K1 | K2 | B1 | B2 | B3 | K0 | B0 | SOL A | SOL B | SOL C | SOL D | SOL E |
| N, P | O | | | | | | O | OFF | OFF | OFF | OFF | OFF |

TABLE 3-continued

| SPEED RANGES & SPEED STAGES | COUPLED PATTERNS | | | | | | | SOLENOID PATTERNS | | | | |
|---|---|---|---|---|---|---|---|---|---|---|---|---|
| | MAIN TRANSMISSION | | | | | SUB-TRANS- MISSION | | MAIN TRANSMISSION | | | SUB-TRANS- MISSION | |
| | K1 | K2 | B1 | B2 | B3 | K0 | B0 | SOL A | SOL B | SOL C | SOL D | SOL E |
| R | O | | O | | | | O | OFF | OFF | OFF | OFF | OFF |
| FIRST SPEED | | O | (O) | | | | O | OFF | ON | OFF (ON) | OFF | OFF |
| SECOND SPEED | | O | (O) | | O | | | OFF | ON | OFF (ON) | OFF | ON |
| THIRD SPEED | | O | (O) | | O | | O | ON | ON (OFF) | OFF (ON) | OFF | OFF |
| FOURTH SPEED | O | O | | Ⓧ | | | O | ON | OFF | OFF | OFF | OFF |
| FIFTH SPEED | O | O | | Ⓧ | | O | | ON | OFF | OFF | OFF | ON |

TABLE 4

| SPEED RANGES & SPEED STAGES | COUPLED PATTERNS | | | | | SOLENOID PATTERNS | | |
|---|---|---|---|---|---|---|---|---|
| | K1 | K2 | B1 | B2 | B3 | SOL A | SOL B | SOL C |
| N, P | O | | | | | OFF | OFF | OFF |
| R | O | | O | | | OFF | OFF | OFF |
| MAIN TRANS- MISSION | | | | | | | | |
| FIRST SPEED | | O | | | | OFF | ON | OFF |
| FIRST SPEED (A) | | O | O | | | OFF | ON | ON |
| SECOND SPEED | | O | O | | O | ON | OFF | ON |
| SECOND SPEED (A) | | O | | | O | ON | ON | OFF |
| SECOND SPEED (B) | | O | O | | | OFF | OFF | ON |
| THIRD SPEED | O | O | | Ⓧ | | ON | OFF | OFF |
| THIRD SPEED (A) | O | O | | | | OFF | OFF | OFF |

Figure 5:
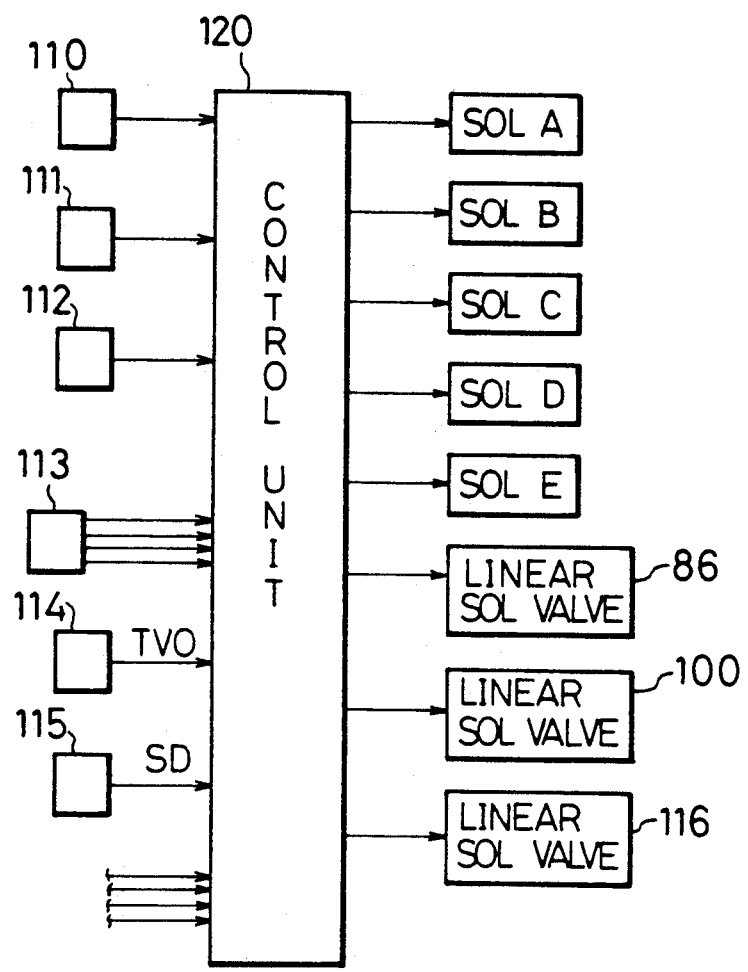
FIG. 5 is a schematic representation showing a control system of the automatic transmission according to the embodiment of the present invention.

Control Shift (FIG. 5)

Then, a description will be made of the control system for controlling the automatic transmission AT.

As shown in FIG. 5, the control system for the automatic transmission AT comprises a control unit 120 consisting of an A/D converter for converting analog input signals to digital output signals, a plurality of waveform shaping circuits, an input-output interface, a microcomputer, a plurality of drive circuits, and so on. The ROM of the microcomputer is stored in advance among others with a shift map using the vehicle speed and the angle of opening of a throttle valve as parameters, and with a control program for implementing the shift control on the basis of the various input signals and the shift map (including the solenoid patterns corresponding to the speed ranges and the speed stages of the automatic transmission AT). Further, it is noted herein that the control program for the shift control contains a shift control as will be described hereinafter.

To the control unit 120 are electrically connected the on-off solenoid valves SOL A, SOL B, and SOL C of the main transmission 3, the on-off solenoid valves SOL D and SOL E of the auxiliary transmission 4, and the linear solenoid valves 86, 100, and 116. Into the control unit 120 are entered an input signal detected by a first sensor 110 for detecting the speed of rotation of the output shaft 2a of the turbine 21; an input signal detected by a second sensor 111 for detecting the speed of rotation of the output shaft 3a of the main transmission 3; an input signal detected by a third sensor 112 for detecting the speed of rotation of the output shaft 4b of the auxiliary transmission 4; a shift signal corresponding to each speed range to be detected by plural switches disposed in a shift lever 113; a signal TVO, indicative of the angle of the opening of the throttle valve, from a sensor 114 for detecting the angle of opening of the throttle valve of the engine 1; a signal SD, indicative of the speed of a vehicle, from a sensor 115 for detecting the speed of the vehicle; and other signals detected by brake switches and so on. The first, second, and third sensors 110, 111, and 112 may be of an electromagnetic pick-up type and they are shown in FIG. 2.

On the other hand, the control unit 120 generates output signals for driving the on-off solenoid valves SOL A, SOL B, and SOL C of the main transmission 3 and the on-off solenoid valves SOL D and SOL E of the auxiliary transmission 4 and output pulse signals for driving the linear solenoid valves 86, 100, and 116. The linear solenoid valve 116 is disposed so as to adjust the modulator pressure $P_M$.

Shift Control (FIGS. 6-13)

As a representative example of the simultaneous shift of the main transmission 3 and the auxiliary transmission 4 in this embodiment, the case of an shift from the 2nd speed stage to the 3rd speed stage is taken. In the description which follows, the automatic shift mode from the 2nd speed stage to the 3rd speed stage is referred to merely as the 2-3 shift and other shift modes will be referred to in the same manner.

Figure 6:
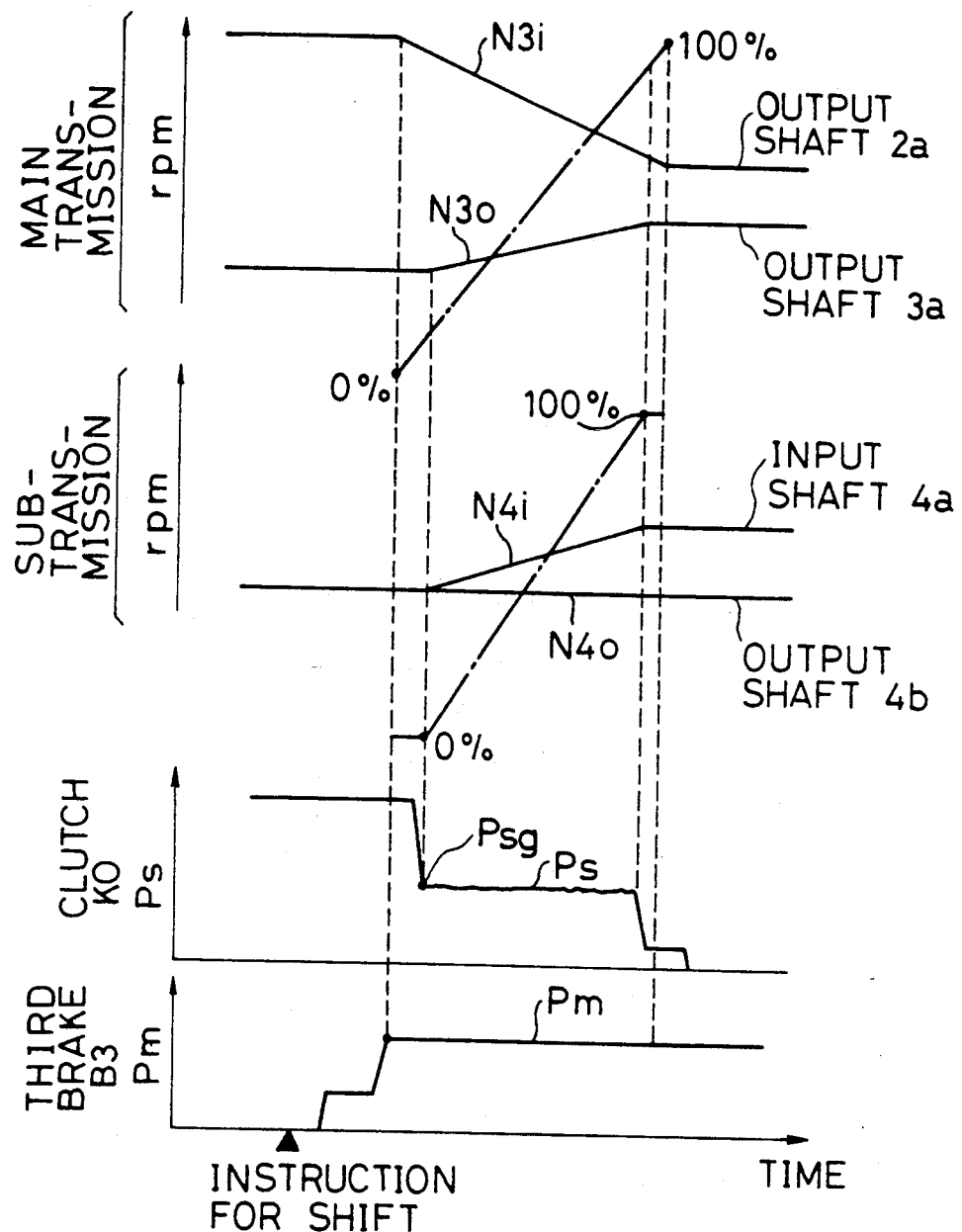
FIG. 6 is a time chart showing an example of the numbers of rotation of the main and auxiliary transmissions as well as the coupling pressure of the clutch KO and the third brake B3 at the time of transition of the 2-3 shift, according to the embodiment of the present invention.
Figure 7:
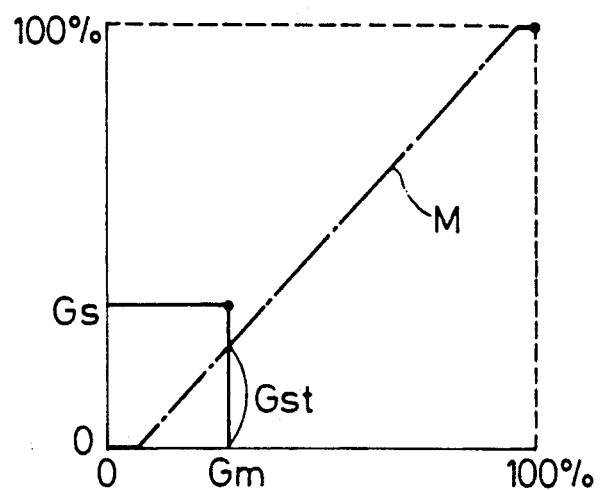
FIG. 7 is a graph showing a target shift progress value.

In the 2-3 shift, it is required that the third brake B3 of the main transmission 3 is to be coupled, while the coupling of the clutch K0 of the auxiliary transmission 4 is to be released and the brake B0 thereof is to be coupled. In order to control the coupling of these friction coupling elements and the releasing of the coupling thereof in an appropriate manner, the shift of the main transmission 3 is first started and thereafter the shift of the auxiliary transmission 4 is started, as shown in FIG. 6; then, coupling pressure Ps (or pressure for releasing the coupling) of the clutch K0 is subjected to feedback control so as to follow a target shift progress value M preset by using a gear ratio progress value Gm of the main transmission 3 and a gear ratio progress value Gs of the auxiliary transmission 4 as parameters, for example, as shown in FIG. 7, the coupling pressure Ps of the clutch kO exerting an influence directly upon the gear ratio progress value Gs of the auxiliary transmission 4; an initial pressure Psg of the coupling pressure Ps is corrected by a learning control; and a coupling pressure Pm for coupling the third brake B3 of the main transmission 3 is corrected by the learning control so as to allow a shift time T of the main transmission 3 to become a target shift time Tt.

Figure 8:
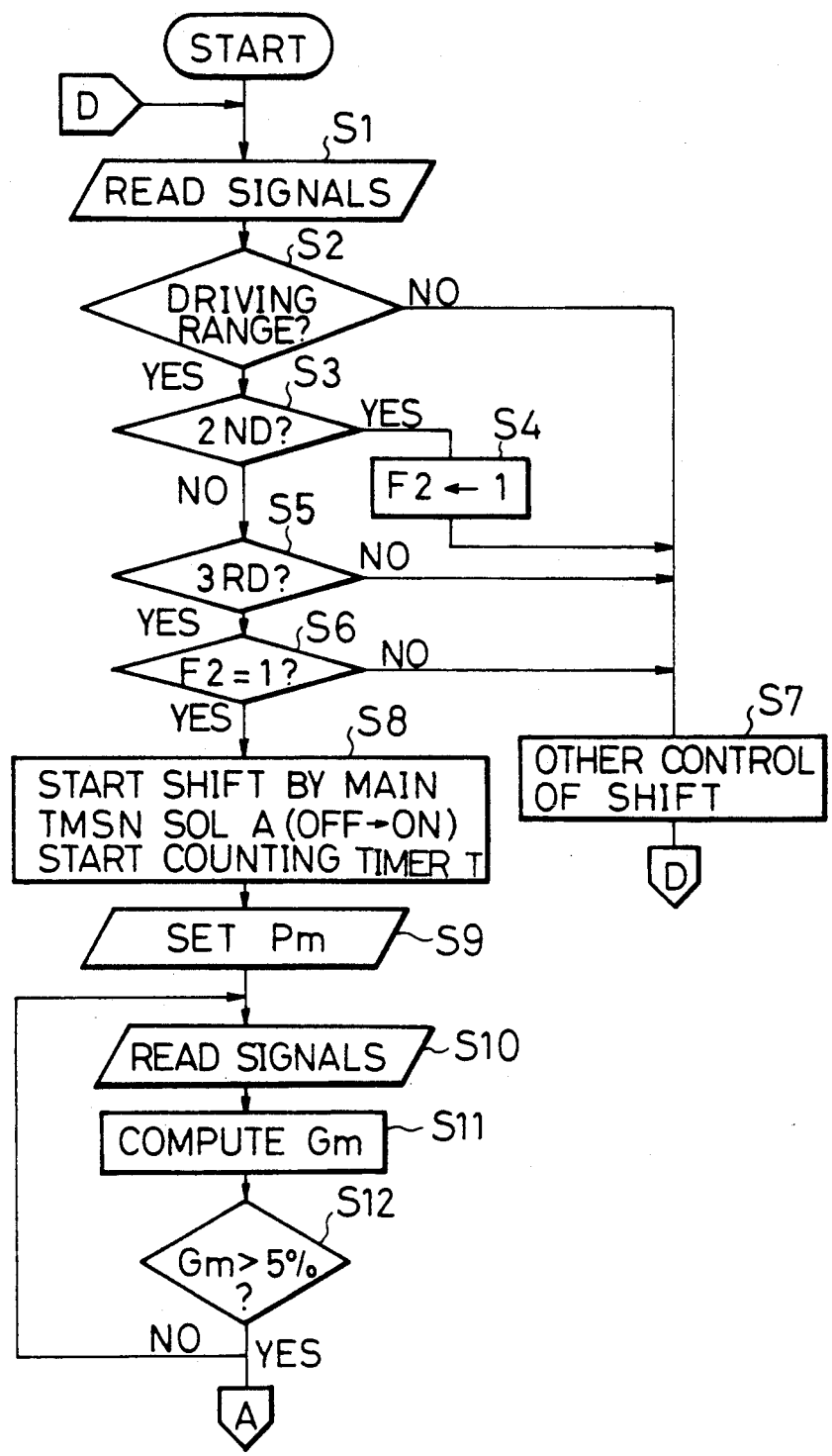
FIG. 8 is a portion of a flowchart showing a routine of the shift control of the automatic transmission according to the embodiment of the present invention.
Figure 9:
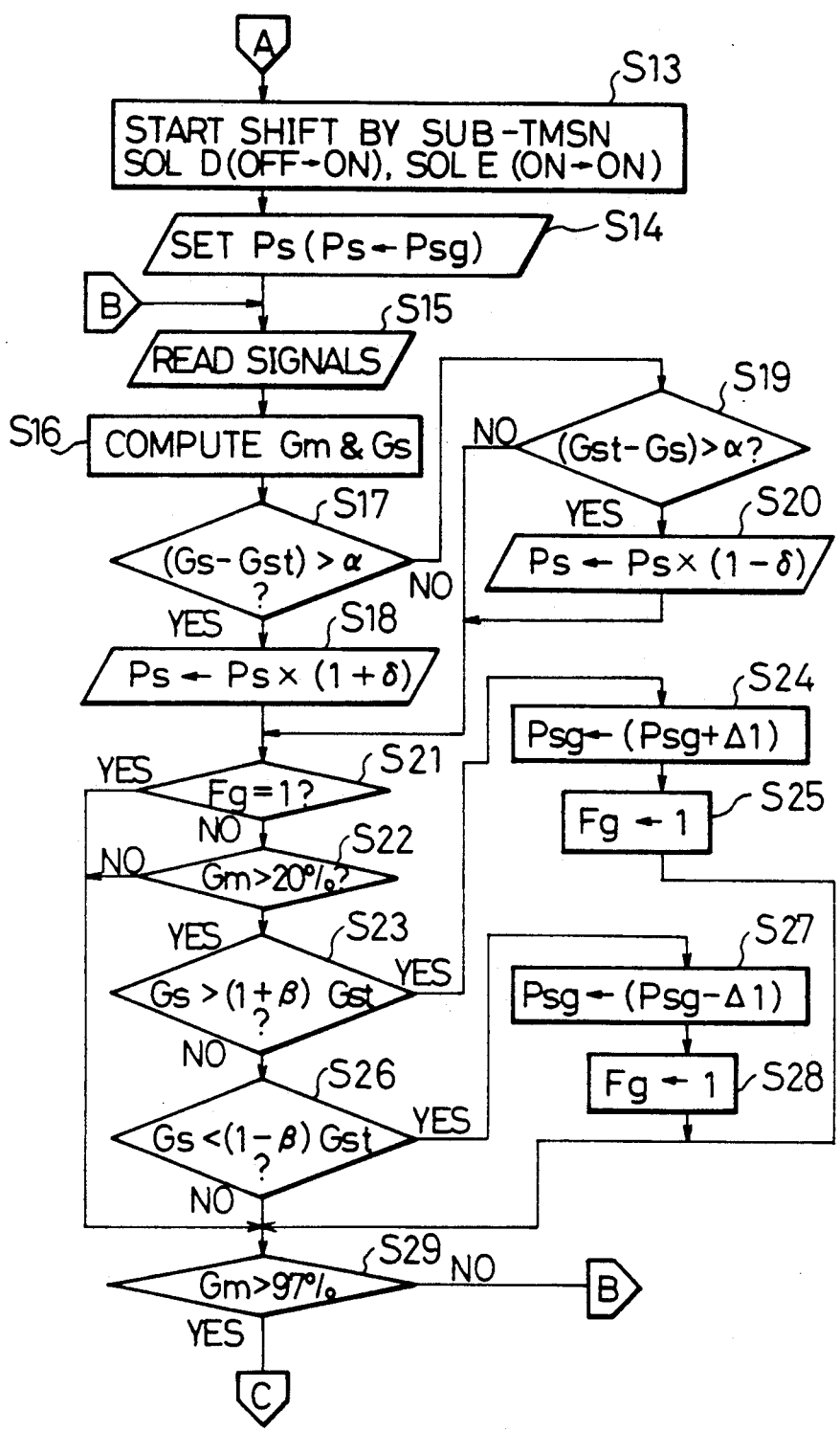
FIG. 9 is a portion of a flowchart showing a routine of the shift control of the automatic transmission according to the embodiment of the present invention.
Figure 10:
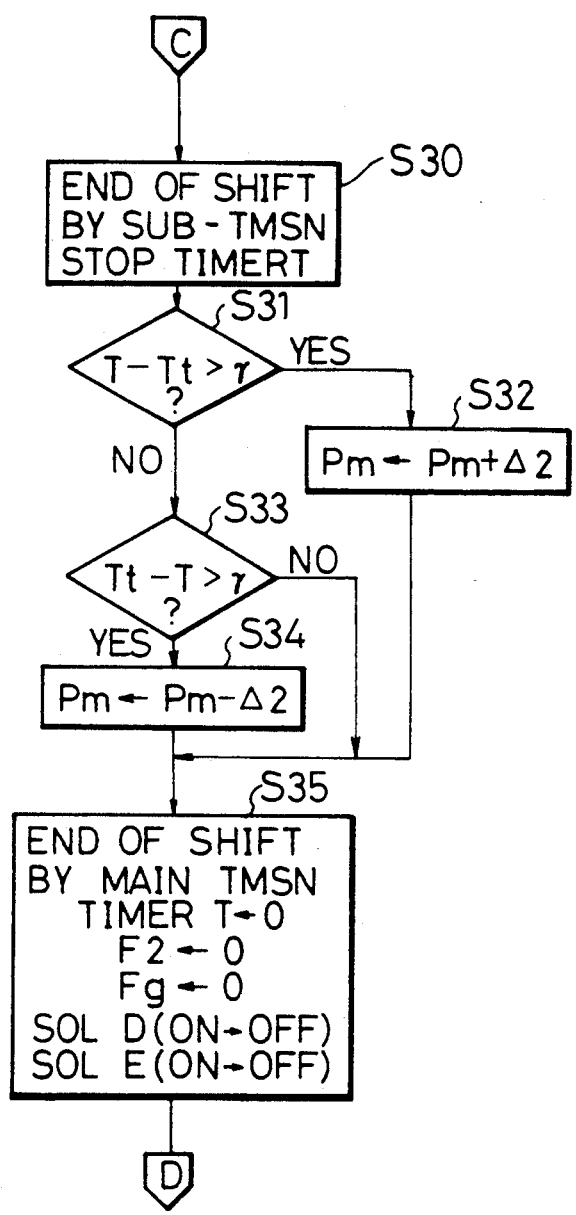
FIG. 10 is a portion of a flowchart showing a routine of the shift control of the automatic transmission according to the embodiment of the present invention.

The following is a description of an outline of the control routine for the shift control with reference to the flowcharts of FIGS. 8-10. It can be noted herein that the shift control is started as an ignition switch is turned on and it is ended as the ignition switch is turned off.

After the start of the shift control, the various signals are read from the sensors and the switches at step S1, following by proceeding to step S2 where it is decided to determine if the speed range is a drive range. When the decision at step S2 gives the affirmative result, then the program flow goes to step S3 at which a decision is made to determine if the speed stage is second speed stage. When the result of decision at step S3 indicates that the speed stage is the second speed stage, on the one hand, then the program flow goes to step S4 at which a flag F2 set for determining the automatic shift from the second speed to the third speed, i.e. the 2-3 shift mode, is set to one and further to step S7. When the decision at step S3 gives the negative result, then the program flow goes to step S5 at which it is further decided to determine if the speed stage is the third speed stage. When the decision at step S5 gives the affirmative result, then the program flow goes to step S6 at which it is further decided to determine if the flag F2 is set to one, on the one hand, and when it is decided at step S5 that the speed stage is not the third speed stage, on the other hand, then the program flow goes to step S7. Then, when it is decided at step S6 that the flag F2 is set to one, i.e. when the shift from the second speed stage to the third speed stage has been carried out yet the 2-3 shift mode has been finished, then the program flow goes to step S8, and when the decision at step S6 gives the negative result, then the program flow goes to step S7. In the flow charts in FIG. 8, the main transmission is referred to as "MAIN TMSN" for brevity of explanation, and this reference can be applicable to the flow charts of the other drawings.

Then, at step S7, the general shift control is implemented, for example, on the basis of the shift map.

When it is confirmed in a series of steps S1 to S6 that the second speed stage has been shifted to the third speed stage, then the program flow goes to step S8 at which the shift of the main transmission 3 is started and the timer T starts counting from "O", thereby the on-off solenoid valve SOL A is turned on to couple the third brake B3. Then, at step S9, the coupling pressure Pm for coupling the third brake B3 is set to a value read from memory while being updated by the learning control as will be described hereinafter (steps S31-34), and the driving pulse signals corresponding to the coupling pressure Pm is generated to the linear solenoid valve 86.

Then, at step S10, the various signals are read in the same manner as at step S1, and the gear ratio progress value Gm of the main transmission 3 is computed at step S11. It can be noted herein that the gear ratio progress value Gm is a parameter for determining a state of progress of the shift of the main transmission 3 and further that the gear ratio progress value Gm can be computed by the following formula:

$$Gm = (Grs - Gr)/(Grs - Gre),$$

wherein

Gr is the current gear ratio of the main transmission and it can be computed by the following formula: Gr=N3$_i$N3$_0$, where N3$_i$ is the number of rotation of the output shaft 2a of the torque converter 21, and N3$_0$ is the number of rotation of the output shaft 3a of the main transmission 3;

Grs is the gear ratio when the gear ratio Gm is 0% (at the time of the start of the shift); and Gre is the gear ratio when the gear ratio Gm is 100% (at the time of the end of the shift).

Referring back to FIG. 8, it is then decided at step S12 to determine if the gear ratio progress value Gm is larger than 5%. If the result of decision at step S12 indicates that the gear ratio progress value Gm is equal to or smaller than 5%, then the program flow goes back to step S10 and the execution of the program from step S10 to step S12 is repeated. When it is decided at step S12 that the gear ratio progress value Gm is larger than 5%, then the program flow goes to step S13 in FIG. 9.

Then, at step S13, the shift of the auxiliary transmission 4 is started and the on-off solenoid valve SOL D is turned on and the on-off solenoid valve SOL D is held in an ON state in order to accurately control the coupling pressure Ps of the clutch K0 through the linear solenoid valve 100 of the hydraulic path 101. In FIG. 9 and the drawings which follow, the auxiliary transmission 4 is referred to as "SUB-TMSN" for brevity of explanation. It is to be noted herein that the brake B0 is coupled so as to brake the engine at the time of coasting during the third speed stage and that it is not required to couple the brake B0 at the time of transition of this shift because the one-way clutch WOC0 is provided, so that the on-off solenoid valve SOL D may be shifted to its ON state.

After step S13, then the program flow goes to step S14 at which a learning coupling pressure Psg is read from memory, the learning coupling pressure Psg being an initial pressure of the coupling pressure Ps (or the pressure for releasing the coupling) of the clutch K0 stored and held in the memory while being updated by another learning control as will be described hereinafter (steps S21-S28). Further, the coupling pressure Ps is set by setting the learning coupling pressure Psg to the coupling pressure Ps of the clutch K0, and driving pulse signals corresponding to the resulting coupling pressure Ps are generated to the linear solenoid valve 100.

Then, at step S15, the various signals are read, followed by proceeding to step S16 at which the gear ratio progress value Gm of the main transmission 3 and the gear ratio progress value Gs of the auxiliary transmission 4 are computed in the same manner as described hereinafter.

Figure 11:
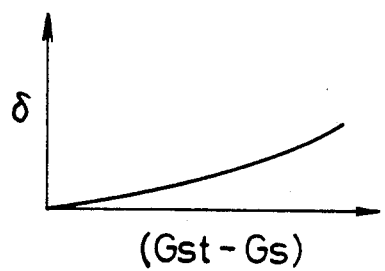
FIG. 11 is a characteristic diagram showing a feedback control correction coefficient.

After the completion of the computation of the gear ratio progress values Gm and Gs, the program flow goes to step S17. At step S17, as shown in FIG. 7, the resulting gear ratio progress values Gm and Gs are applied to the target shift progress value M, thereby computing a target gear ratio progress value Gst of the auxiliary transmission 4, and a decision is made to determine if the difference between the gear ratio progress value Gs and the target gear ratio progress value Gst, i.e. Gs-Gst, is larger than a dead-zone value α. It can be noted herein that the dead-zone value α may be set to, for example, 2%. If the result of decision at step S17 indicates that the difference therebetween is larger than the dead-zone value α, then the program flow goes to step S18 at which the coupling pressure Ps is set to Ps×(1+δ) to increase the pressure, because the coupling pressure Ps of the clutch K0 is too low so that the gear ratio progress value Gs becomes too large. Then, the driving pulse signals corresponding to the increased coupling pressure Ps are generated to the linear solenoid valve 100. In this case, reference symbol "δ" denotes a feedback correction coefficient which is smaller than one and which can be computed on the basis of characteristics preset by using the difference (Gst−Gs) as a parameter, as shown in FIG. 11. Thereafter, the program flow goes to step S21.

Figure 12:
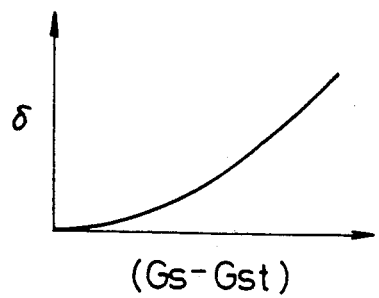
FIG. 12 is a characteristic diagram showing a feedback control correction coefficient.

On the other hand, if the result of decision at step S17 indicates that the difference is equal to or smaller than the dead-zone value α, then the program flow goes to step S19 at which the difference between the target gear ratio progress value Gst and the gear ratio progress value Gs is larger than the dead-zone value α. If the decision at step S19 gives the affirmative result, it is determined that the coupling pressure Ps of the clutch K0 is too high so that the gear ratio progress value Gs becomes too small. Thus, at step S20, the coupling pressure Ps is set to Ps×(1δ), wherein reference symbol "δ" is the feedback correction coefficient which is smaller than one and which can be computed on the basis of characteristics preset by using the difference (Gst−Gs) as a parameter, as shown in FIG. 12. Then, the program flow goes to step S21. On the other hand, if the difference (Gst−Gs) is equal to or smaller than the dead-zone value α, it is found unnecessary to subject the coupling pressure Ps to feedback correction so that the program flow goes to step S21.

Then, at step S21, it is decided to determine if a learning flag Fg is set to "1". As this decision gives the negative result in the initial stage, the program flow first goes to step S22 at which it is further decided to determine if the gear ratio progress value Gm is larger than 20%. When the decision at step S22 gives the negative result in the initial stage, then the program flow goes back to step S15 through step S29 and this process is repeated. As a result, the decision at step S22 eventually gives the affirmative result, then the learning control is executed from step S23 to step S28, followed by proceeding to step S29. Then, at step S29, it is decided to determine if the gear ratio progress value Gm is larger than 97%. When the result of decision at step S29 indicates that the gear ratio progress value Gm is smaller than or equal to 97%, on the one hand, then the program flow goes to step S15, and when it is decided at step S29 that the gear ratio progress value Gm is larger than 97%, on the other hand, then the program flow goes to step S30.

Then, a description will be made of the learning control for correcting the initial pressure of the coupling pressure Ps. At this end, first, at step S23, it is decided to determine if the gear ratio progress value Gs is larger than $(1+\delta)\times$Gst, wherein reference symbol β may be set, for example, to 0.05. The affirmative result given by the decision at step S21 means that the progress of the shift is too fast, so that the coupling pressure Ps of the clutch K0 is caused to decrease too fast. Hence, at step S24, the learning coupling pressure Psg is increased and corrected to (Psg+Δ1), followed by proceeding to step S25 at which the learning flag Fg is set to "1" and then proceeding to step S29. On the other hand, when the decision at step S23 gives the negative result, then the program flow goes to step S26 at which the gear ratio progress value Gs is smaller than $(1-\beta)\times$Gst. The affirmative result of the decision at step S26 indicates that the decrease of the coupling pressure Ps is too slow, so that the program flow goes to step S27 at which the learning coupling pressure Psg is reduced by correcting it to (Psg−Δ1) and then to step S28 at which the learning flag Fg is set to "1", followed by proceeding to step S29. As described hereinafter, the learning coupling pressure Psg is increased or decreased and then corrected for the control of the 2-3 shift that follows next.

As described hereinafter, when the shift progresses with time and the gear ratio progress value Gm exceeds 97%, then the program flow goes from step S29 to step S30 in FIG. 10. At step S30, the auxiliary transmission 4 is forcibly suspended to finish the shift and the timer T is suspended to count. Thereafter, the learning control for correcting the coupling pressure Pm of the third brake B3 is executed in the process from step S31 to step S34.

More specifically, at step S31, a decision is made to determine if the difference between an elapsed period of time T and a target period of time Tt, i.e. T-Tt, exceeds a given value, γ, for example, which may be set to, for example, 0.1 second, wherein T is the shift time required for the main transmission 3 and counted by the timer T, and Tt is the target period of time preset for the shift time T. If the decision at step S31 gives the affirmative result, it is confirmed that the coupling pressure Pm of the third brake B3 is too low so that the shift time is extended longer than the predetermined period of time. Hence, the program flow goes to step S32 at which the learning coupling pressure Pm stored in the memory is increased and corrected by an increment Δ2 and it is set to Pm+Δ2, followed by proceeding to step S35. The increment Δ2 may be set to, for example, 0.3 kg/cm².

On the other hand, when the decision at step S31 gives the negative result, then the program flow goes to step S33 at which the difference between the target period of time, Tt, and the elapsed period of time, T, i.e. Tt−T, is larger than the predetermined value γ, it is determined that the shift period of time is shortened due to the too high coupling pressure Pm, so that, in this case, the learning coupling pressure Pm is decreased by decrement Δ2 and corrected. The decrement Δ2 may be set to, for example, 0.3 kg/cm². Thereafter, the program flow goes to step S35.

Then, at step S35, the shift of the main transmission 3 is suspended as well as the timer T and the flags Fg and F2 are reset to zero. Further, the on-off solenoid valves SOL D and SOL E are turned off, thereby returning the program flow to step S1 in FIG. 8.

It can be noted herein that, in place of the learning control for the learning coupling pressure Psg by the procedures from step S21 to step S29, there may be used, for example, a learning control as will be described hereinafter.

Figure 13:
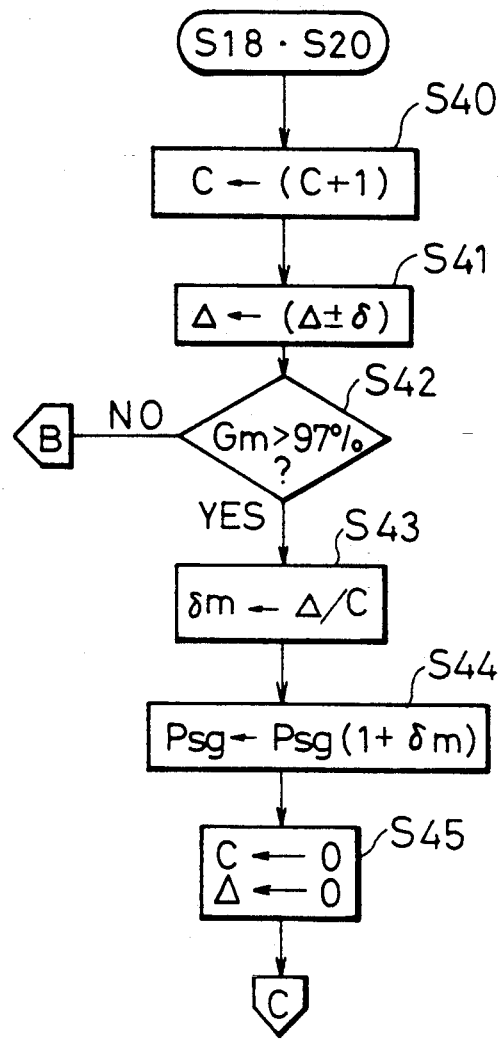
FIG. 13 is a flowchart showing the essential portion of a routine of the feedback control for correcting the coupling pressure Ps according to the embodiment of the present invention.

As shown in FIG. 13, at step S40, the count of the counter C is increased one after another from "1" by adding an increment "1", after the feedback control of the coupling pressure Ps from step S16 to step S20. Then, at step S41, a current feedback correction coefficient δ is added to the sum Δ of the previous feedback correction coefficients δ in the instance of step S18 (where the coupling pressure Ps is set to Ps×(1+δ) to increase the pressure), on the one hand, and the current feedback correction coefficient δ is subtracted from the sum Δ thereof in the instance of step S20 (where the coupling pressure Ps is set to Ps×(1−δ)). It can be noted herein that the sum Δ is reset to zero upon initialization. Then, at step S42, a decision is made to determine if the gear ratio progress value Gm is larger than 97%, in the same manner as the decision is made at step S29. When the decision gives the negative result, then the program flow is returned back to step S15 from which the execution is in turn repeated. When the result of decision at step S42 indicates that the gear ratio progress value Gm is larger than 97%, then the program flow goes to step S43 at which a mean value δm of the feedback correction coefficients δ is computed by dividing the sum Δ of the feedback correction coefficients δ with "C" (where "C" is the count of the counter C), i.e. Δ/C. Then, at step S44, the learning coupling pressure Psg stored in the memory is updated to Psg(1+δm), followed by proceeding to step S45 at which the counter C is reset to zero and the sum Δ is reset to zero and then going to step S30 at which the auxiliary transmission 4 and the timer T are forced to be suspended.

Next, a description will be made of the action of the shift control as described hereinafter.

By subjecting the coupling pressure Ps of the clutch K0 of the auxiliary transmission 4 to feedback control so as to follow the target shift progress value M, the gear ratio progress value Gs of the auxiliary transmission 4 is controlled in an appropriate way, thereby capable of suppressing the shift shock from occurring to a minimized extent. Further, the learning coupling pressure Psg as the initial pressure of the coupling pressure Ps is corrected by the learning control in the manner as described hereinafter, so that correction is made of a variation in shift characteristics due to affecting factors, such as abrasion of an abrasive material for the friction coupling elements, oil temperature, changes in characteristics of operating oil, abrasion of gears, engine load, open air temperature, atmospheric pressure, and so on, thereby capable of stabilizing the feedback control and improving responsiveness. In addition, the coupling pressure Pm of the friction coupling elements at the side of the main transmission 3 is corrected by the learning control in the manner as described hereinafter so as to make the shift time T of the main transmission 3 the target shift time Tt, thereby allowing the shift of the main transmission 3 to be executed within the nearly target shift time Tt and capable of avoiding a delay in the responsiveness of the shift control and preventing a decrease in acceleration from occurring due to the delay in the shift.

Furthermore, accuracy in the learning control can be attained by correcting the learning coupling pressure Psg on the basis of the sum Δ of the feedback correction coefficients thereby improving the responsiveness to the feedback control of the coupling pressure Ps.

Other Examples of Shift Control (FIGS. 14–27)

a. Outline of Shift Control

An outline of the shift control for, for example, the 2-3 shift mode according to the other embodiments of the present invention will be described with reference to FIG. 14 that is substantially identical to FIG. 6.

Figure 19:
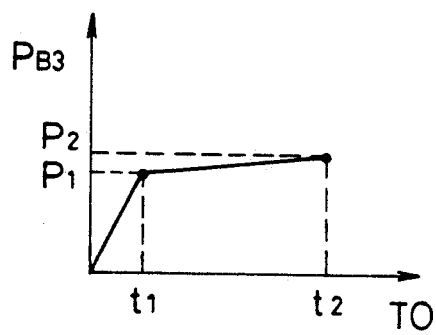
FIG. 19 is a map for use in another embodiment of the present invention.

When the shift is to be made from the second speed stage to the third speed stage, the shift of the main transmission 3 is first started. The 2-3 shift mode involves coupling the third brake B3 of the main transmission 3 and releasing the coupling of the clutch K0 of the auxiliary transmission 4. As shown in FIG. 14, when an instruction to execute the shift is given, the coupling hydraulic pressure of the third brake B3 begins rising after a delay of an invalid stroke proportion of a piston of the third brake B3 of the main transmission 3. The coupling pressure for the third brake B3 is set, for example, so as to agree with the angle of opening of the throttle valve as shown in FIG. 19, and the feedforward control is implemented from the start of the shift to the end thereof.

Figure 20:
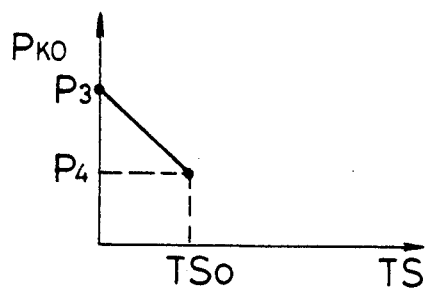
FIG. 20 is a map for use in another embodiment of the present invention.

Then, as the actual gear ratio progress value Gm of the main transmission 3 has reached a predetermined value Gmo, for example, 5%, the shift of the auxiliary transmission 4 is allowed to start. The shift of the auxiliary transmission 4 is executed for an initial period of time, TSo, by subjecting the coupling pressure Pko of the clutch K0 to feedforward (F/F) control, as shown in FIG. 20. This initial feedforward control causes the coupling pressure Pko of the clutch K0 to decrease from P3 to P4, and this value P4 is set as an initial value for the feedback control as will be described hereinafter. It can be noted herein that the value P4 is a final value of the feedforward control and it corresponds to the initial coupling pressure Psg in FIG. 6.

Figure 21:
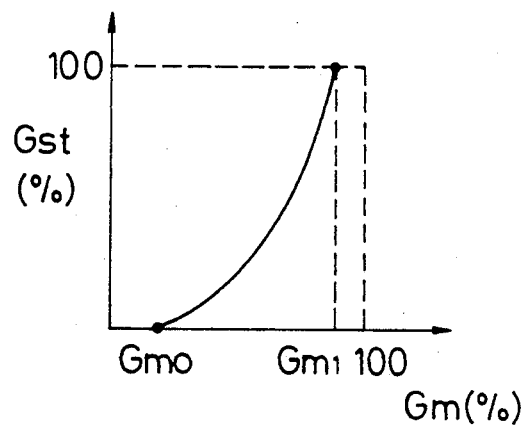
FIG. 21 is a map for use in another embodiment of the present invention.

As the feedforward control for the auxiliary transmission 4 has been finished, the coupling pressure Pko of the clutch K0 is subjected to feedback control up to the time when the shift of the auxiliary transmission 4 has been finished. The feedback control is implemented so as to adapt the actual gear ratio progress value Gs of the auxiliary transmission 4 to become the target gear ratio progress value Gst as a predetermined target value. As shown in FIG. 21, the gear ratio progress value Gs of the auxiliary transmission 4 is so set as to become 100% and as to finish the shift of the auxiliary transmission 4, when the target gear ratio progress value Gst becomes a predetermined value Gm1 prior to the timing when the gear ratio progress value Gm of the main transmission 3 becomes 100%. The predetermined value Gm may be set to, for example, 90%.

Upon the implementation of the shift control, the control will be performed in a manner as will be described hereinafter.

Firstly, as shown in FIG. 19, basic control values P1 and P2 for the feedforward control to be implemented for the main transmission 3 are corrected by the learning control on the basis of the time required up to the end of the actual shift of the main transmission 3, and the time required until the end of the shift of the main transmission 3 is converged into a target predetermined time, as will be described hereinafter on the procedures from step Q51 to step Q55 in FIG. 18.

Secondly, the feedback control of the auxiliary transmission 4 is implemented by correcting the basic control value Pko (Gm) of FIG. 23 with a feedback control correction amount ΔPko of FIG. 22, as will be described hereinafter on the procedures from steps Q26, Q30, Q31, and Q33–Q35 in FIG. 16. Standard values (control gains) P5 and P6 for setting the basic control value Pko (Gm) are corrected by the learning control so as to allow the actual gear ratio progress value Gs of the auxiliary transmission 4 to follow the target gear ratio progress value Gst with high accuracy, as will be described hereinafter on the procedure at step Q62 in FIG. 18.

Thirdly, the learning control for the auxiliary transmission 4 in the manner as described hereinafter is inhibited when the actual period of time required until the end of the shift of the main transmission 3 deviates from the predetermined target period of time to a large extent. This inhibition of the learning control for the auxiliary transmission 4 serves as preventing the implementation of an undesirable shift control for the auxiliary transmission 4 on the basis of the learning control. This inhibition is executed when the negative result is given by a decision at step Q56 in FIG. 18.

Fourthly, control gains ΔP1 and ΔP2 for the feedback control are gradually decreased as the feedback control correction amount ΔPko (actually, the sum ΣΔGs of deviations ΔGs of the gear ratio progress values Gs serving as the basis for the computation of the feedback control correction amount ΔPko) become smaller than the predetermined value, as described hereinafter on the procedures from step Q57 and step Q58 in FIG. 18. This control can improve the performance for converging the feedback control.

Figure 18:
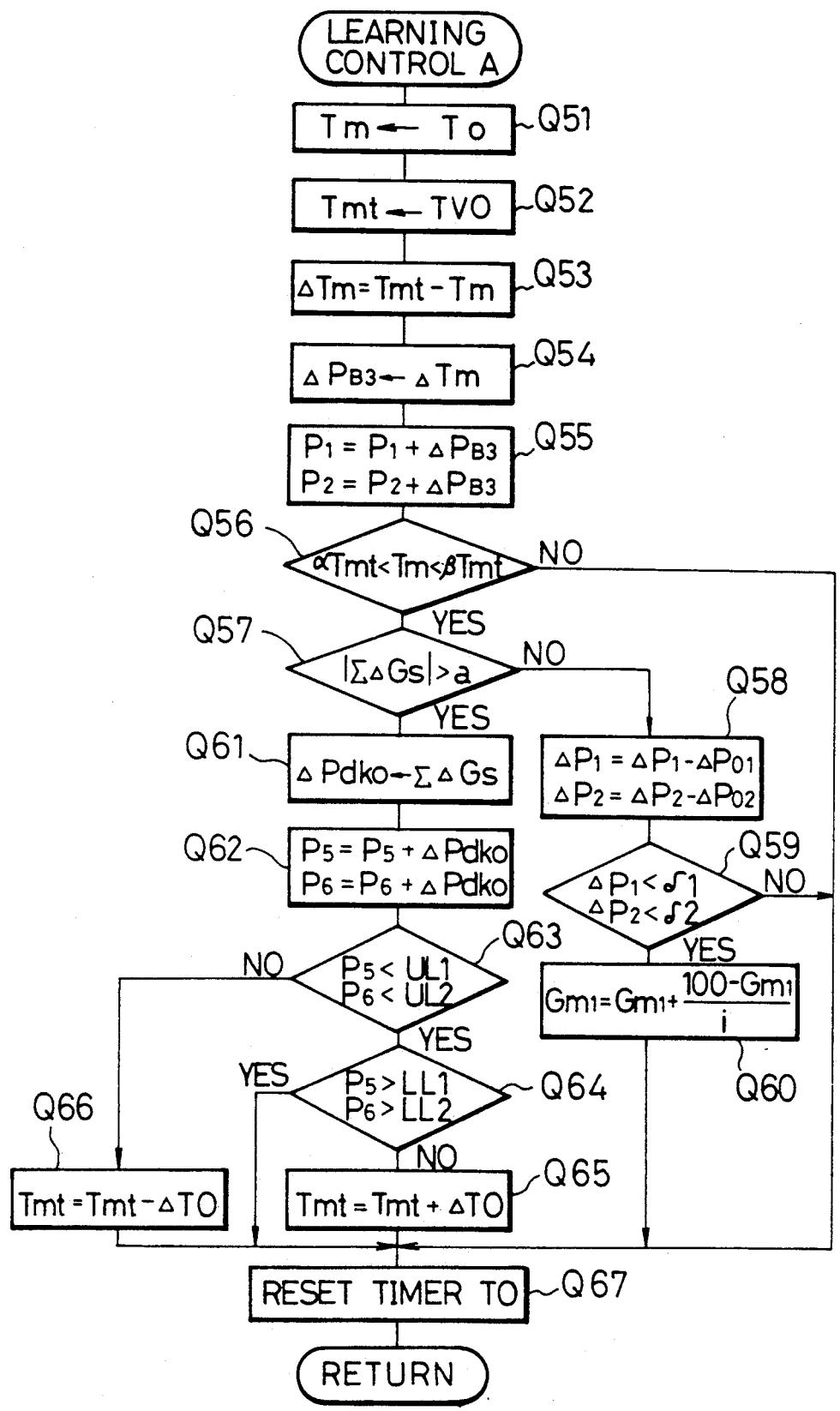
FIG. 18 is a flowchart showing another embodiment of the present invention.

Fifthly, as the control gains ΔP1 and ΔP2 becomes smaller than the predetermined value, the value Gm1 of FIG. 21 is so varied as to become closer to 100% gradually, thereby approaching the timing of the end of the shift of the auxiliary transmission 4 to the timing of the end of the shift of the main transmission 3 and eventually finishing the shift of the auxiliary transmission 4 substantially together with the end of the shift of the main transmission 3, as will be described hereinafter on the procedures at steps Q59 and Q60 in FIG. 18.

Figure 23:
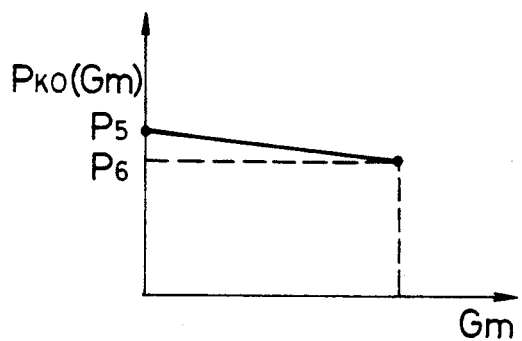
FIG. 23 is a map for use in another embodiment of the present invention.

Sixthly, a target shift time Tmt up to the end of the shift of the main transmission 3 is corrected by the learning control, as will be described hereinafter on the procedures at steps Q63-Q66 in FIG. 18, when the basic control values P5 and P6 for implementing the feedback control of the auxiliary transmission 4 exceed their predetermined upper limit or they become smaller than their predetermined lower limit, as shown in FIG. 23, because necessary measures cannot be taken by only the control at the side of the auxiliary transmission 4.

Seventhly, when the auxiliary transmission 4 is subjected to feedforward control, the initial value P4 for the start of the feedback control, i.e. the end value of the termination of the feedforward control, as shown in FIG. 20, is corrected by the learning control on the basis of the decision of determination if the shift of the auxiliary transmission 4 has been started at the time of the start of the feedback control. This correction allows the actual shift of the auxiliary transmission 4 to be started in synchronization with the start of the feedback control.

b. Details of Shift Control (excluding Learning Control)

A detailed description will then be made of the details of the shift control with reference to the flow charts in FIGS. 15-18.

Figure 15:
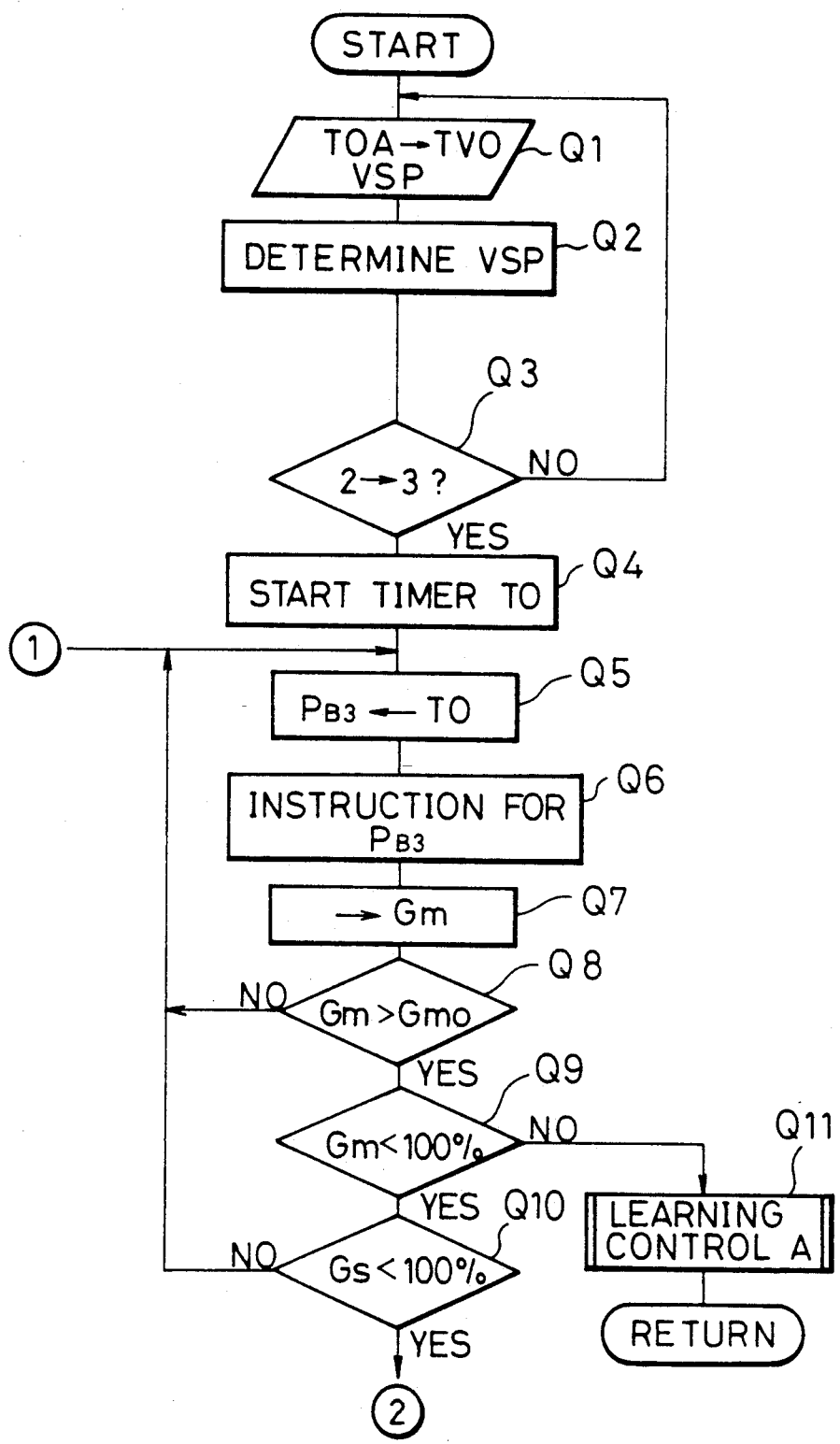
FIG. 15 is a flowchart showing another embodiment of the present invention.

First, at step Q1 of FIG. 15, signals from the various sensors, at least signals indicative of the angle of opening of the throttle valve, TVO, and the vehicle speed (referred to as VSP in FIG. 15), are read, followed by proceeding to step Q2 at which it is decided to determine if a shift is to be executed on the basis of the shift characteristics set by using the angle of opening of the throttle valve and the vehicle speed.

When the result of decision at step Q2 indicates that the shift should be implemented, then the program flow goes to step Q3 at which it is further decided to determine if the determination at step Q2 is a shift from the second speed stage to the third speed stage, i.e. a 2–3 shift mode. When the decision at step Q3 gives the negative result, then the program flow is returned to step Q1 because the result of the decision indicates that no shift is executed or the resulting shift is nothing to do with the 2–3 shift involved currently in question and it is executed in conventional manner.

On the other hand, when the decision at step Q3 give the affirmative result, a timer TO is started at step Q4, followed by proceeding to step Q5 at which the timer value TO is collated with a map, as shown in FIG. 19, which is set for every angle of opening of the throttle valve, TVO, and a basic control value PB3 for the main transmission 3 is read on the basis of the timer value TO, and, then, proceeding to step Q6 at which the basic control value PB3 is generated. It can be noted herein that the basic control value PB3 is a voltage signal corresponding to the coupling pressure of the third brake B3.

Figure 14:
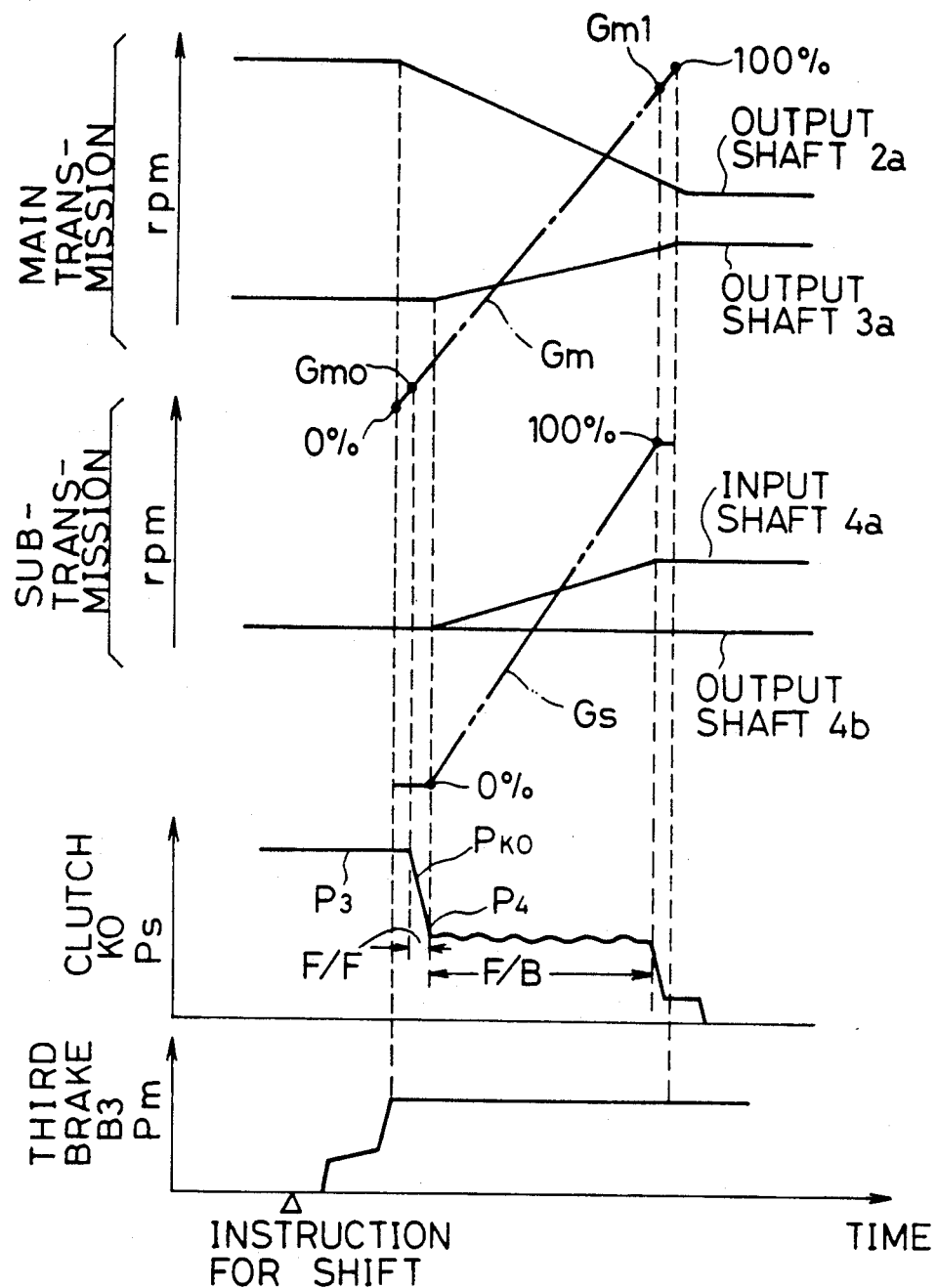
FIG. 14 is a time chart showing another example of the numbers of rotation of the main and auxiliary transmissions as well as the coupling pressure of the clutch KO and the third brake B3 at the time of transition of the 2-3 shift, according to another embodiment of the present invention.

Then, at step Q7, the actual gear ratio progress value Gm of the main transmission 3 is read and computed, followed by proceeding to step Q8 at which it is decided to determine if the actual gear ratio progress value Gm is greater than a predetermined value Gmo that indicates the timing for the start of the shift of the auxiliary transmission 4, as shown in FIGS. 14 and 21.

When the decision at step Q8 gives the negative result, the timing is not ready for starting the shift of the auxiliary transmission 4 so that the program flow is returned to step Q5 and the shift of the main transmission 3 only progresses.

On the other hand, when it is decided at step Q8 that the actual gear ratio progress value Gm is greater than the predetermined value Gmo, a decision is then made to determine if the actual gear ratio progress value Gm is smaller than 100%. In the initial stage of the decision, the decision at step Q9 gives the negative result and the program flow goes to step Q10 at which it is further decided to determine if the actual gear ratio progress value Gs of the auxiliary transmission 4 is smaller than 100%.

Figure 16:
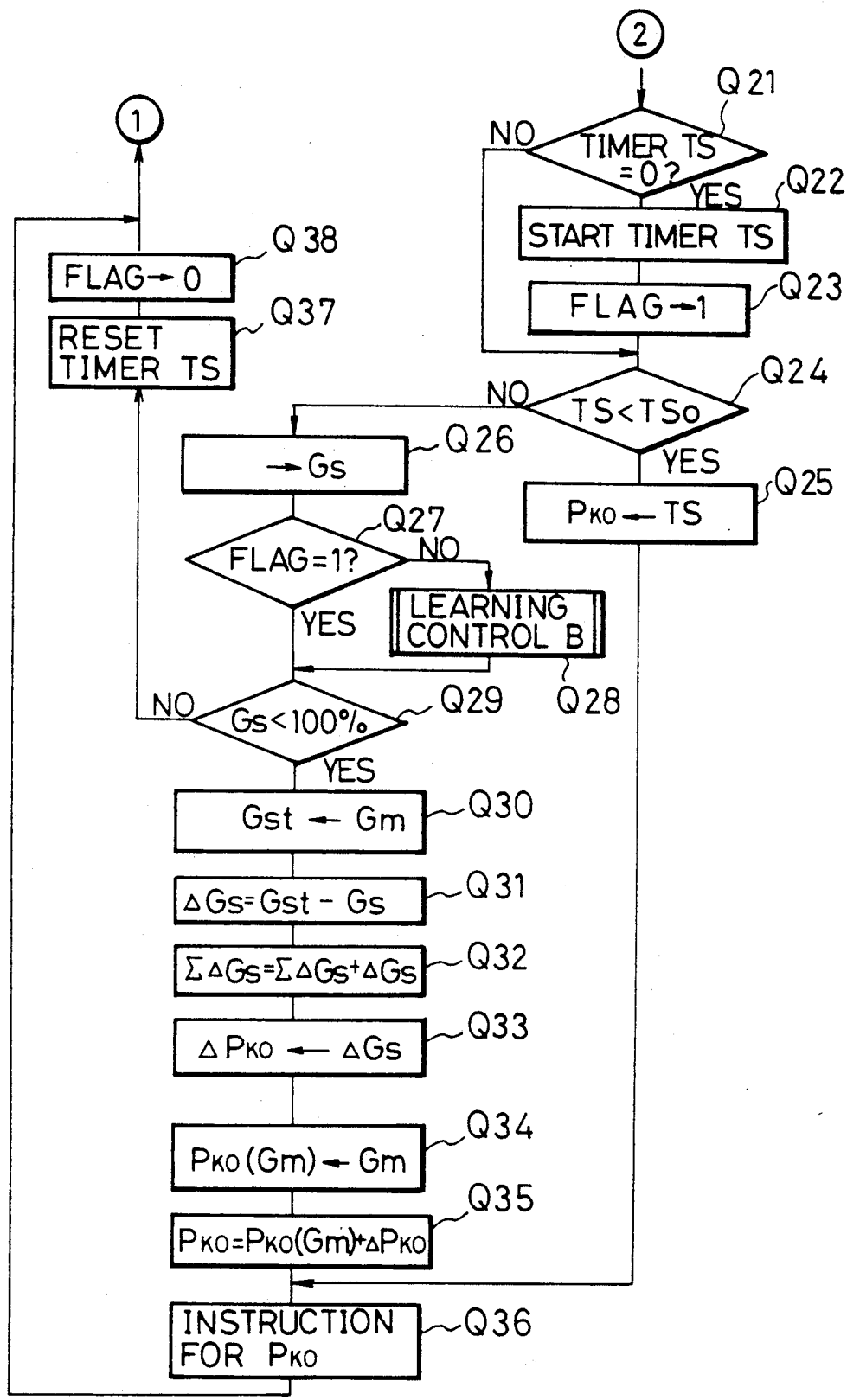
FIG. 16 is a flowchart showing another embodiment of the present invention.

In the initial stages, the decision at step Q10 gives the affirmative result, followed by proceeding to step Q21 of FIG. 16 at which it is decided to determine if the timer value TS is set to zero. When the decision at step Q21 gives the affirmative result, the timer value TS is started at step Q22, followed by proceeding to step Q23 at which the flag is reset to zero and further to step Q24. On the other hand, when the decision at step Q21 gives the negative result, then the program flow goes to step Q24 without passage through steps Q22 and Q23.

Then, at step Q24, it is decided to determine if the count value TS of the timer is smaller than a predetermined value TSo, that is, if the auxiliary transmission 4 exists within the period of time in which the auxiliary transmission 4 is subjected to feedforward control as shown in FIG. 6. The decision at step Q24 gives the affirmative result in its initial stage, followed by proceeding to step Q25 at which the basic control value Pko is set for the clutch K0 of the auxiliary transmission 4 on the basis of the count value TS of the timer, as shown in FIG. 20, and then by proceeding to step Q36 at which the basic control value Pko is generated.

On the other hand, when the decision at step Q24 gives the negative result, the feedback control of the auxiliary transmission 4 is implemented. In order to implement the feedback control of the auxiliary transmission 4, the actual gear ratio progress value Gs of the auxiliary transmission 4 is read and computed at step Q26, followed by proceeding to step Q27 at which it is then decided to determine if the flag is set to one. At the first time when the program flow went to step Q27, the flag is reset to zero at step Q23 and then the decision at step Q27 gives the negative result. When the result of decision at step Q27 indicates that the flag is not set to one, the basic control value P4 of FIG. 20 is corrected by the learning control and optimized at step Q28 in a manner as will be described hereinafter, followed by proceeding to step Q29. It can be noted herein that the basic control value P4 is the value at the end of the feedforward control as described hereinafter and the initial value for the feedback control as will be described hereinafter.

Then, at step Q29, it is decided to determine if the gear ratio progress value Gs of the auxiliary transmission 4 is smaller than 100%. In the initial stage of the decision at step Q29, it is decided that the gear ratio progress value Gs is smaller than 100%, followed by proceeding to step Q30 at which the target gear ratio progress value Gst of the auxiliary transmission 4 with respect to the actual gear ratio progress value Gm of the main transmission 3 is determined on the basis of the collation with a map as shown in FIG. 21.

After step Q30, the program flow goes to step Q31 at which a deviation $\Delta$Gst of the gear ratio progress ratio Gs of the auxiliary transmission 4 is computed by subtracting the actual gear ratio progress value Gs from the target gear ratio progress value Gst, followed by proceeding to step Q32 at which the sum value $\Sigma\Delta$Gs is updated by adding the current deviation $\Delta$Gs to the sum value $\Sigma\Delta$Gs of the previous deviations $\Delta$Gs.

Figure 22:
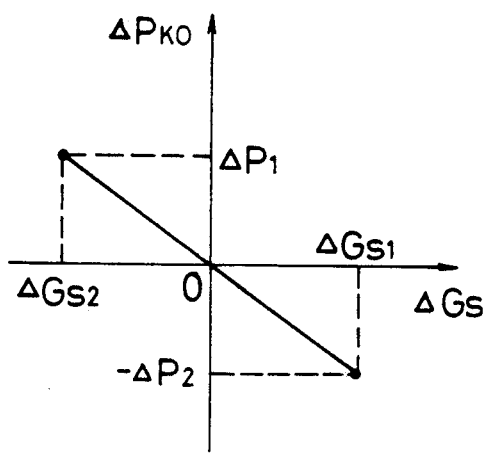
FIG. 22 is a map for use in another embodiment of the present invention.

Then, at step Q33, the deviation $\Delta$Gs computed at step Q31 is collated with the map as shown in FIG. 22 and the feedback control correction amount $\Delta$Pko is determined. Then, at step Q34, the basic control value Pko(Gm) for the feedback control is determined and, at step Q35, a final control value Pko is computed by adding the feedback control correction amount $\Delta$Pko to the basic control value Pko(Gm). Then, the control value Pko set at step Q35 is generated at step Q36.

When the gear ratio progress value Gs becomes larger as the shift of the auxiliary transmission 4 progresses, then the decision at step Q29 gives the negative result. At this time, the shift of the auxiliary transmission 4 is finished by resetting the timer TS to zero at step Q37 and the flag to zero at step Q38, followed by returning to step Q5.

On the other hand, when the decision at step Q29 gives the negative result, the decision at step Q10 gives the negative result, too, thereby returning to step Q5 from step Q10 and allowing the shift of the main transmission 3 to progress.

As the shift of the main transmission 3 further progresses and the actual gear ratio progress value Gm exceeds 100%, the decision at step Q9 gives the negative result and the learning control is implemented at step Q11 in such a manner as will be described hereinafter, followed by returning the program flow to step Q1.

c. Details of Shift Control (Learning Control at Step Q28)

Figure 17:
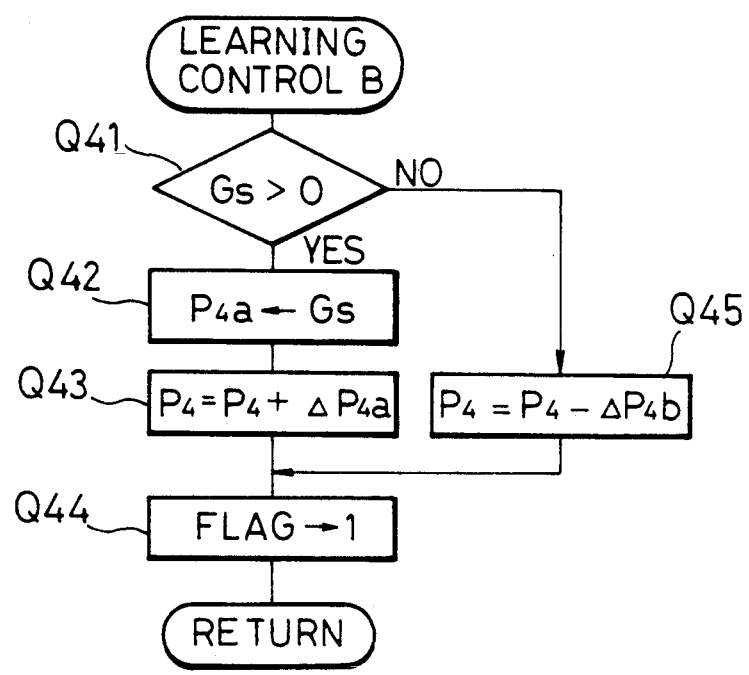
FIG. 17 is a flowchart showing another embodiment of the present invention.
Figure 27:
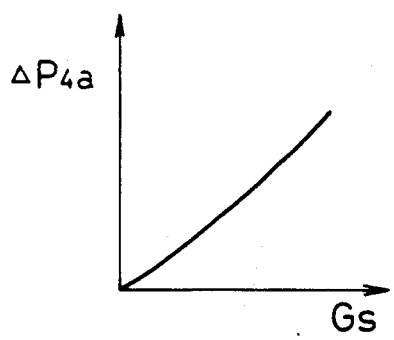
FIG. 27 is a map for use in another embodiment of the present invention.

A description will be made of the details of the learning control at step Q28 in FIG. 16 with reference to FIG. 17. First, at step Q41, it is decided to determine if the actual gear ratio progress value Gs of the auxiliary transmission 4 is zero, in order to determine if the shift of the auxiliary transmission 4 has been started actually. When the result of decision at step Q41 indicates that the gear ratio progress value Gs is zero, it is the time that the shift of the auxiliary transmission 4 has been started actually and the result of this decision means that the final value of the feedforward control for the auxiliary transmission 4, i.e. the initial value for the feedback control therefor, is too small and the coupling pressure for the clutch K0 is too low. Hence, in this case, the actual gear ratio progress value Gs is collated with the map as shown in FIG. 27, and a correction value $\Delta$P4a is determined. Then, at step Q43, the basic control value P4 is corrected by adding the correction value $\Delta$P4a to the previous basic control value P4, as shown in FIG. 20.

On the other hand, when the decision at step Q41 gives the negative result, it is the time that the coupling pressure for the clutch K0 of the auxiliary transmission 4 is too high, so that the current basic control value P4 is corrected at step Q45 by subtracting a predetermined constant value $\Delta$P4b from the previous basic control value P4.

After steps Q43 and Q45, the program flow goes to step Q44 at which the flag is set to "1", followed by the return to step Q29 in FIG. 16.

As have been described hereinabove, the learning control is implemented so as for the actual gear ratio progress value of the auxiliary transmission 4 to become 0% at the time when the feedforward control of the auxiliary transmission 4 has been finished, i.e. when the feedback control is started. The implementation of the learning control allows the feedback control to be appropriately implemented after the feedforward control in order to set the actual gear ratio progress value Gs of the auxiliary transmission 4 to the target gear ratio progress value Gst.

d. Details of Shift Control (Learning Control at Step Q7)

Further, a description will be made of the details of the learning control, as indicated at step Q7 in FIG. 15, with reference to FIG. 18.

Figure 24:
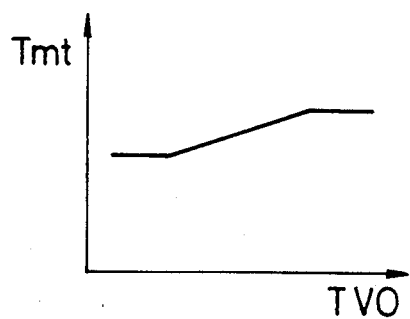
FIG. 24 is a map for use in another embodiment of the present invention.
Figure 25:
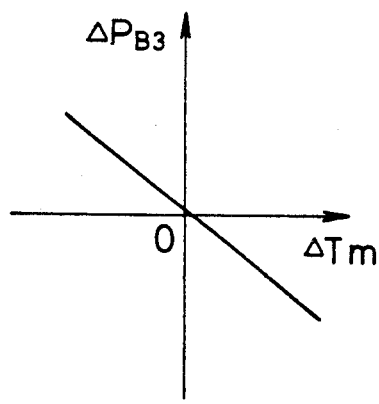
FIG. 25 is a map for use in another embodiment of the present invention.

First, at step Q51, the timer T0 is counted and the count is set as an actual shift time Tm for the main transmission 3. Then, at step Q52, a target time Tmt until the end of the shift of the main transmission 3 is set on the basis of the angle of opening of the throttle valve, TVO, by collation with the map as shown in FIG. 24, followed by proceeding to step Q53 at which a deviation $\Delta$Tm is computed by subtracting the actual shift time Tm from the target shift time Tmt and then proceeding to step Q54 at which a correction amount $\Delta$PB3 is determined on the basis of the deviation $\Delta$Tm by collation with the map as shown in FIG. 25.

Then, at step Q55, the basic control values P1 and P2 of FIG. 19 are updated by adding the correction amount $\Delta$PB3 to the previous basic control values P1 and P2 as shown in FIG. 19. More specifically, the basic control value P1 on the map is updated to P1+$\Delta$PB3), and the basic control value P2 on the map is also updated to (P2+$\Delta$PB3). Thus, the basic control values P1 and P2 for subjecting the main transmission 3 to feedforward control is corrected by the learning control so as to cause the time required until the end of the shift of the main transmission 3 to converge at the target shift time Tmt.

Thereafter, the program flow goes to step Q56 at which it is decided to determine if the actual time Tm required until the end of the shift of the main transmission 3 is converged at the time close to the predetermined target time Tmt, i.e. if the actual time Tm is converted, for example, at nearly plus or minus 10% of is converted, target time Tmt. More specifically, it is decided to determine if the actual time Tm exists in the range between a lower limit of the target time Tmt, i.e. αTmt (where α is a constant that is larger than zero yet smaller than 1), and an upper limit of the target time Tmt, i.e. βTmt (where β is a constant that is larger than 1).

When it is decided at step Q56 that the actual time Tm is longer than the lower limit of the target time, αTmt, yet shorter than the upper limit of the target time, βTmt, then the program flow goes to step Q57 at which a decision is further made to determine if the absolute value of the sum ΣΔGs computed at step Q32 is larger than a predetermined constant value a. If the decision at step Q57 gives the negative result, then the program flow goes to step Q58 at which the feedback control correction amounts ΔP1 and ΔP2 are decreased by subtracting predetermined constant values ΔP01 and ΔP02 from the standard values ΔP1 and ΔP2 for determining the feedback control correction amounts as shown in FIG. 22, respectively. The processing at step Q58 is so adapted as to make smaller the degree of inclination of the characteristic line for determining the feedback control correction amount as shown in FIG. 22, thereby making the control gain for the feedback control smaller.

After step Q58, it is decided at step Q59 to determine if the resulting standard values ΔP1 and ΔP2 are smaller than constants δ1 and δ2, respectively, each having a predetermined constant value. It can be noted herein that the decision at step Q59 is to determine if the control is in such a state that each of the standard values for the feedback correction, i.e. control gains ΔP1 and ΔP2, is made small enough to be sufficiently converged at the target value Gst.

When the decision at step Q59 gives the affirmative result, then the program flow goes to step Q60 at which the value Gm1 of FIG. 21 is altered by the formula: Gm1=Gm1+(100−Gm1)/i (where i is an integer that is 2 or larger). The decision at step Q60 is involved with the proceeding for approaching the value Gm1 gradually to 100%, thereby capable of finishing the shift of the main transmission 3 simultaneously with the shift of the main transmission 4. The simultaneous end of the shift of the main transmission 3 in synchronization with the end of the shift of the auxiliary transmission 4 can prevent a shift shock from occurring due to the sole maintenance of the shift of the main transmission 3.

In other words, the shift shock can effectively be prevented due to the delivery and the receipt of torque between the main transmission 3 and the auxiliary transmission 4 during the progress of the shift of the main transmission 3 and the auxiliary transmission 4, i.e. during a period of time when the target gear ratio progress value Gst in FIG. 21 is set. On the other hand, when the shift of the auxiliary transmission 4 has been finished and the shift is implemented by the main transmission 3 only, a certain degree of the shift shock may be caused to occur because the delivery and the receipt of the torque cannot be utilized; however, the shift shock is so designed as to be prevented in a more effective way by approaching the value Gm1 to 100% and shortening the shift time of the main transmission 3 only.

Figure 26:
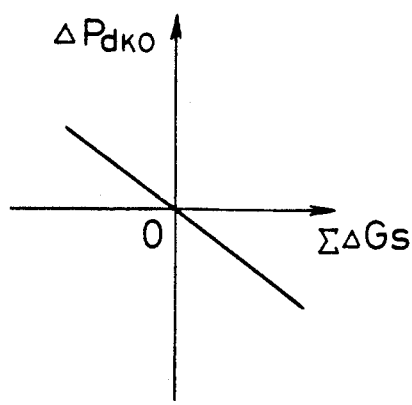
FIG. 26 is a map for use in another embodiment of the present invention.

On the other hand, when the decision at step Q57 gives the affirmative result, it is considered that the setting of the standard values P5 and P6 for the feedback control are not appropriate or that the setting of the target time Tmt until the end of the shift of the main transmission 3 is not appropriate, due to the too large feedback control correction amount is too large. Hence, in this case, the feedback control correction amount ΔPdko is set at step Q61 on the basis of the sum ΣΔGs set at step Q32 by collation with the map as shown in FIG. 26. Then, at step Q62, each of the standard values P5 and P6 for the feedback control, as shown in FIG. 23, is updated by adding the feedback control correction amount ΔPdko to the values P5 and P6, respectively, thereby overwriting the map in FIG. 23.

After step Q62, the program flow goes to step Q63 at which it is decided to determine if the values P5 and P6 obtained at step Q62, i.e. learning values P5 and P6, are smaller than predetermined upper limit constants UL1 and UL2, or guard values, respectively. When the decision at step Q63 gives the negative result, the gear ratio progress value Gs of the auxiliary transmission 4 exists outside the range that can be dealt with merely by changing the values P5 and P6, that is, there is the limit upon the further delay of the gear ratio progress value Gs of the auxiliary transmission 4. More specifically, as will be apparent from FIG. 14, the fact that the values P5 and P6 are made larger means that the coupling pressure of the clutch K0 is made larger, thereby delaying the releasing of the coupling of the clutch K0. This results in delaying the gear ratio progress value Gs of the auxiliary transmission 4. At this time, at step Q66, the target time Tmt as shown in FIG. 24 is altered to a value obtained by subtracting a predetermined constant ΔTO from the previous target time Tmt, thereby overwriting the map in FIG. 24 so as to shorten the target time Tmt. Thereafter, the program flow goes to step Q67 at which the timer TO is reset to zero, followed by the return to step Q1.

On the other hand, when the decision at step Q63 gives the affirmative result, then the program flow goes to step Q64 at which it is decided to determine if the learning values P5 and P6 altered at step Q62 are larger than predetermined lower limit constants LL1 and LL2, as guard values, respectively. The negative result of the decision at step Q64 indicates that the gear ratio progress value Gs of the auxiliary transmission 4 exists outside the range that can be dealt with merely by changing the values P5 and P6, that is, that there is the limit upon making the gear ratio progress value Gs of the auxiliary transmission 4 faster. Hence, at this time, the target time Tmt as shown in FIG. 24 is changed at step Q65 to a value obtained by adding the predetermined constant time ΔTO to the previous target time Tmt, thereby prolonging the target time Tmt and overwriting the map as shown in FIG. 24. After step Q65, then the program flow goes to step Q67 at which the timer TO is reset to zero, followed by the return to step Q1.

On the other hand, when it is decided at step Q64 that the values P5 and P6 are larger than the predetermined lower limit constants LL1 and LL2, respectively, then the program flow goes to step Q67 without passage through step Q65 or Q66, because the alteration of the target time Tmt is not required.

Further, the negative result of the decision at step Q56 indicates that the actual shift time Tm until the end of the shift of the main transmission 3 deviates to a large extent from the target time Tmt. At this time, the program flow goes to step Q67 as it is, without implementing any processing at steps Q57 et seq. As have been described hereinabove, the negative result of the decision at step Q56 indicates that the shift control of the main transmission 3 is not necessarily implemented in a favorable manner, so that the learning control for the auxiliary transmission 4 is inhibited to prevent an undesirable shift control for the auxiliary transmission 4 from occurring due to the learning control.

What is claimed is:

1. A control system for an automatic transmission with a main transmission and an auxiliary transmission connected thereto, so adapted as for each of said main transmission and auxiliary transmission to implement a shift by changing an operating state of a hydraulic friction coupling element thereof, said control system comprising:

target value setting means for setting a target value for a shift progress state in which the shift progresses at the time of the shift, when the shift of the automatic transmission as a whole is implemented by shifting said main transmission substantially together with said auxiliary transmission;

feedback control means for implementing feedback control for coupling pressure of said friction coupling element thereof so as to allow an actual shift progress state at the time of the particular shift to follow said target value; and first learning control means for correcting the coupling pressure of said friction coupling element of either of said main transmission or said auxiliary transmission by learning control on the basis of a deviation of said actual shift progress state for said target value.

2. A control system for an automatic transmission as claimed in claim 1, further comprising:

feedforward control means for implementing feedforward control for coupling pressure for a friction coupling element of said main transmission at the time of the particular shift so as to finish the shift of said main transmission at a predetermined target time;

wherein said feedback control means implements the feedback control for the coupling pressure of the friction coupling element of said auxiliary transmission; and wherein said first learning control means corrects the coupling pressure for the friction coupling element of said auxiliary transmission.

3. A control system for an automatic transmission as claimed in claim 2, further comprising second learning control means for correcting the target time by learning control on the basis of a deviation between an actual time of ending the shift of said main transmission and the target time thereof.

4. A control system for an automatic transmission as claimed in claim 2, wherein said first learning control means is adapted to determine a correction amount for the learning control on the basis of a mean value of feedback control correction amounts by said feedback control means.

5. A control system for an automatic transmission as claimed in claim 3, further comprising a control gain altering means for altering a control gain for determining the feedback control correction amount to a smaller value as the feedback control correction amount by said feedback control means becomes smaller.

6. A control system for an automatic transmission as claimed in claim 5, further comprising shift progress state altering means for altering a predetermined shift progress state immediately prior to the end of the shift in a direction of approaching said predetermined shift progress state to the end of the shift of said main transmission as said control gain becomes smaller;

wherein said target value is set so as to finish the shift of said auxiliary transmission when the shift progress state of said main transmission reaches said predetermined shift progress state immediately prior to the end of the shift.

7. A control system for an automatic transmission as claimed in claim 3, wherein:

the shift progress state of said main transmission is set as a first gear ratio progress value;

the shift progress state of said auxiliary transmission is set as a second gear ratio progress value; and said target value is set as a target gear ratio progress value of said auxiliary transmission for the first gear ratio progress value of said main transmission.

8. A control system for an automatic transmission as claimed in claim 3, further comprising target time altering means for altering said target time when a learning value by said first learning control means exists outside a predetermined guard value.

9. A control system for an automatic transmission as claimed in claim 8, wherein the learning value by said first learning control means is adapted to alter said target time to a shorter time when the learning value by said first learning control means exists outside the guard value in a direction of delaying the shift of the auxiliary transmission.

10. A control system for an automatic transmission as claimed in claim 8, wherein the learning value by said first learning control means is adapted to alter said target time to a longer time when the learning value by said first learning control means exists outside the guard value in a direction of making the shift of the auxiliary transmission faster.

11. A control system for an automatic transmission as claimed in claim 8, wherein:

the learning value by said first learning control means is adapted to alter said target time to a shorter time when the learning value by said first learning control means exists outside a first guard value in a direction of delaying the shift of the auxiliary transmission; and the learning value by said first learning control means is adapted to alter said target time to a longer time when the learning value by said first learning control means exists outside a second guard value in a direction of making the shift of the auxiliary transmission faster.

12. A control system for an automatic transmission as claimed in claim 2, further comprising an inhibition means for inhibiting the learning control by said first learning control means when an actual time at which the shift of said main transmission is ended is not converged at a predetermined range of said target time.

13. A control system for an automatic transmission as claimed in claim 2, wherein the shift of said auxiliary transmission is started when the shift of said main transmission progresses by a predetermined time proportion from the start of the shift of said main transmission.

14. A control system for an automatic transmission as claimed in claim 13, wherein the shift of said auxiliary transmission progresses by feedforward control during a predetermined time from the start of the shift of said auxiliary transmission, prior to the control by said feedback control means.

15. A control system for an automatic transmission as claimed in claim 2, wherein said target value is set so as to finish the shift of the auxiliary transmission when said main transmission is brought into a predetermined shift progress state immediately prior to the end of the shift of said main transmission.

16. A control system for an automatic transmission as claimed in claim 2, wherein said feedback control means is adapted to correct a basic coupling pressure of said auxiliary transmission.

17. A control system for an automatic transmission as claimed in claim 16, wherein said basic coupling pressure of said auxiliary transmission is set on the basis of an actual shift progress state of said main transmission.

18. A control system for an automatic transmission as claimed in claim 2, wherein said feedforward control means is adapted to correct a basic coupling pressure of said main transmission.

19. A control system for an automatic transmission as claimed in claim 18, wherein the basic coupling pressure of said main transmission is set on the basis of a time elapsed from the start of the shift thereof.

20. A control system for an automatic transmission as claimed in claim 2, wherein said target time is set on the basis of an engine load such as an angle of opening of a throttle valve.

21. A control system for an automatic transmission as claimed in claim 2, wherein one of said main transmission and said auxiliary transmission is upshifted at the time of said particular shift and the other of said main transmission and said auxiliary transmission is downshifted at the time thereof.

22. A control system for an automatic transmission as claimed in claim 2, wherein the number of speed stages for said main transmission is larger than the number of speed stages for said auxiliary transmission.

23. A control system for an automatic transmission as claimed in claim 22, wherein the number of speed stages for said main transmission is three or more, and the number of speed stages for said auxiliary transmission is two.

24. A control system for an automatic transmission with a main transmission and an auxiliary transmission connected thereto, each having a multiple shift gear mechanism and a hydraulic friction coupling element for shifting a passage for transmitting power of said multiple shift gear mechanism, said control system comprising:

feedforward control means for implementing feedforward control for a coupling pressure of said friction coupling element for said main transmission so as to finish the shift of said main transmission within a predetermined target time at the time of a particular shift when the automatic transmission is shifted as a whole by shifting said main transmission substantially together with said auxiliary transmission;

target gear ratio progress value determining means for determining a target gear ratio progress value of said auxiliary transmission on the basis of an actual gear ratio progress value of said main transmission;

feedback control means for implementing feedback control for coupling pressure of said friction coupling element thereof so as for a gear ratio progress value of said auxiliary transmission to follow said target gear ratio progress value at the time of the particular shift;

first learning control means for correcting a basic control value by said feedback control means by learning control on the basis of a feedback control correction amount by said feedback control means; and second learning control means for correcting a basic control value by said feedforward control means by learning control on the basis of an actual time of finishing the shift of said main transmission.

25. A control system for an automatic transmission as claimed in claim 24, further comprising an inhibition means for inhibiting the learning control by said first learning control means when the actual time of finishing the shift of said main transmission is deviated from said target time by a predetermined value.

26. A control system for an automatic transmission as claimed in claim 24, further comprising target time altering means for altering said target time when a learning value obtained by correcting said basic control value by said first learning control means exists outside a predetermined guard value.

27. A control system for an automatic transmission as claimed in claim 24, wherein:

said target time is set on the basis of an engine load such as an angle of opening a throttle valve;

said basic control value for said feedforward control means is set on the basis of a time elapsed from the start of the shift of said main transmission;

said basic control value for said feedback control means is set on the basis of an actual gear ratio progress value of said main transmission;

a correction amount by said feedback control means is set on the basis of a deviation between an actual gear ratio progress value of said auxiliary transmission and said target gear ratio progress value;

a correction amount by said first learning control means is set on the basis of a deviation between a sum of deviations between the actual gear ratio progress value of said auxiliary transmission and said gear ratio progress value; and a correction amount by said second learning control means is set on the basis of an actual time of finishing the shift of said main transmission and said target time.

28. A control system for an automatic transmission as claimed in claim 24, wherein:

the shift of said auxiliary transmission is started in a state in which the shift of said main transmission progresses by a predetermined gear ratio progress value from the start of the shift thereof; and the shift of said auxiliary transmission progresses by said feedforward control means prior to said feedback control means during a predetermined time from the start of the shift of said auxiliary transmission.

29. A control system for an automatic transmission as claimed in claim 24, wherein said target gear ratio progress value is set so as to finish the shift of said auxiliary transmission when the actual gear ratio progress value of said main transmission becomes a predetermined gear ratio progress value set as a value closer to 100%.

* * * * *